US009767183B2

(12) United States Patent
Su et al.

(10) Patent No.: US 9,767,183 B2
(45) Date of Patent: Sep. 19, 2017

(54) METHOD AND SYSTEM FOR ENHANCED QUERY TERM SUGGESTION

(71) Applicant: Yahoo! Inc., Sunnyvale, CA (US)

(72) Inventors: Hang Su, Vienna, VA (US); Chi Hoon Lee, Santa Clara, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 329 days.

(21) Appl. No.: 14/586,277

(22) Filed: Dec. 30, 2014

(65) Prior Publication Data

US 2016/0188619 A1    Jun. 30, 2016

(51) Int. Cl.
*G06F 7/00*    (2006.01)
*G06F 17/30*    (2006.01)

(52) U.S. Cl.
CPC ................... *G06F 17/3064* (2013.01)

(58) Field of Classification Search
CPC .............. G06F 17/3064; G06F 17/30864
See application file for complete search history.

(56) References Cited

U.S. PATENT DOCUMENTS

| 6,523,026 | B1 * | 2/2003 | Gillis | G06F 17/30637 707/3 |
| 7,590,626 | B2 * | 9/2009 | Li | G06F 17/30672 704/238 |
| 8,027,990 | B1 * | 9/2011 | Mysen | G06F 17/3064 707/758 |
| 8,386,456 | B1 * | 2/2013 | Paiz | G06F 17/30864 707/706 |
| 8,504,562 | B1 * | 8/2013 | Ikeda | G06F 17/30672 707/723 |
| 8,577,913 | B1 * | 11/2013 | Hansson | G06F 17/30 707/767 |
| 8,725,756 | B1 * | 5/2014 | Garg | G06F 17/30864 707/750 |
| 2012/0191745 | A1 * | 7/2012 | Velipasaoglu | G06F 17/3064 707/767 |
| 2013/0041878 | A1 * | 2/2013 | Satyanarayana | G06F 17/3097 707/706 |

* cited by examiner

*Primary Examiner* — Marc Somers
(74) *Attorney, Agent, or Firm* — Pillsbury Winthrop Shaw Pittman LLP

(57) ABSTRACT

Method, system, and programs for providing enhanced query term suggestions. Candidate query terms may be obtained based on a prefix of incomplete query terms received. The candidate query terms may be ranked, at least partially based on, their similarities with respect to query terms previously entered in the same search session as the incomplete query term. In some implementations, for determining such similarities, feature vectors and/or signatures may be stored in association with query terms. Similarity between a candidate query term and query terms in the same search session as the incomplete query term may be determined using the feature vectors and/or signatures associated therewith.

20 Claims, 18 Drawing Sheets

METHOD AND SYSTEM FOR ENHANCED QUERY TERM SUGGESTION

BACKGROUND

1. Technical Field

The present teaching relates to methods, systems and programming for search. Particularly, the present teaching is directed to methods, systems, and programming for suggesting query term(s) to a user.

2. Discussion of Technical Background

The advancement in the world of the Internet has made it possible to make a tremendous amount of information accessible to users located anywhere in the world. A search engine is a computer system or application that helps a user to locate the information. Using a search engine, a user can execute a query via a query term to obtain a list of information (i.e., query results) that matches the query term. While search engines may be applied in a variety of contexts, search engines are especially useful for locating resources that are accessible through the Internet.

Some search engines order the list of matching information before presenting the list to a user. For achieving this, a search engine may be configured to assign a rank to the matching information in the list. When the list is sorted by rank, matching information with a relatively higher rank may be placed closer to the head of the list than other matching information with relatively lower ranks. The user, when presented with the sorted list, sees the most highly ranked matching information first. To aid the user in his/her query, a search engine may rank the matching information according to relevance. Relevance is a measure of how closely the subject matter of particular information matches a query term.

In a typical situation, the user is enabled to enter an intended query term from a client computing platform associated with the user (e.g., smartphone, tablet, laptop, desktop, or any other client computing platform) via a user interface. Once the user completes inputting the intended query term, the completed query may be transmitted, over a communications network such as the Internet, to the search engine for execution. The user interface typically comprises an input box that allows the user to enter the intended query term one letter at a time.

Known major search engines have features called "query/query term suggestion" or "query auto-completion (QAC)" designed to help users narrow in on what they are looking for. For example, as users type a query, a list of query term suggestions that have been used by many other users before are displayed to assist the users in selecting a desired query term. Query term suggestion facilitates faster user query input by predicting user's intended full query terms given the user's input query prefix.

To provide query term suggestion based on a prefix entered by a user, known query term suggestion systems typically provide query term suggestions by selecting suggested terms from ranked previously entered query terms with that prefix. For example, if the user has entered the prefix "el", conventional query term suggestion systems typically retrieve query terms that have been previously entered by the user and/or other users with the prefix "el". This may reveal a number of times query terms with prefix "el", such as "electronic machine", "electrical wire" "elephant in Kenya", "Elbert Einstein" and so on, have been entered by the user and/or other users previously. The conventional query term suggestion systems may then select one or more of these query terms—for example the ones that have been entered most of times previously—for suggestion to the user.

Accordingly, there is at least a need to enhance conventional query term suggestion techniques to account for a query context in which a prefix is entered to improve the relevance of the suggestions with respect to the query terms intended by the user.

SUMMARY

The teachings disclosed herein relate to methods, systems, and programming for processing user query inquiries. More particularly, the present teaching relates to methods, systems, and programming for determining proposed query term(s) to be suggested to the user based on input sequence of query terms entered by the user.

In one example, a method, implemented on a machine having at least one processor, storage, and a communication platform connected to a network, for presenting suggesting query terms. Generally, in this method, a similarity between a candidate query term and a search context in which a prefix entered by a user—for example, "el" is entered after "air fare to Kenya", "weather in Kenya in May", "zoos in Kenya" and so on—may be determined for presenting the candidate query term as a query suggestion to the user. Specifically, after an incomplete query term containing a prefix is first received in a first search session from the user, one or more candidate query terms may be obtained based on the prefix; and one or more query terms that have been previously entered by the user within the first search session may also be obtained. A similarity between each of the candidate query term and the query terms in the first search session may be determined. The one or more candidate query terms may then be ranked, at least partially, based on the similarities determined for the candidate query terms. The one or more candidate query terms may be provided to user as query suggestion based on the rankings of the candidate query terms.

For achieving this, storage of query terms may be established, wherein individual entries of the storage may include attributes including a feature vector of a given query term, and/or any other attributes. The feature vector of a given query term may specify one or more features appearing in a search session associated with the given query term. In some implementations, for improving processing efficiency, a signature of the feature vector of the give query term, such as an LSH (Locality Sensitive Hashing) signature, may be stored in association with the given query term. The feature vectors or signatures of any two query terms may be used to determine a similarity between the two query terms.

Other concepts relate to software for implementing the enhanced query term suggestions. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for making enhanced query term suggestions, where when the information is read by the machine, causes the machine to receive, in a first search session, a prefix of a query term from a user; obtain one or more query terms that have been previously entered by the user within the first search session; obtain one or more candidate query terms based on the prefix; determine, for each of the candidate query terms, a similarity between the candidate query term and the one or more query terms; rank the one or more candidate query terms based, at least partially, on the similarity associated with each candidate query term; and provide the one or more candidate query terms as query suggestions to the user based on the rankings of the candidate query terms.

Additional features will be set forth in part in the description which follows, and in part will become apparent to those skilled in the art upon examination of the following and the accompanying drawings or may be learned by production or operation of the examples. The features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
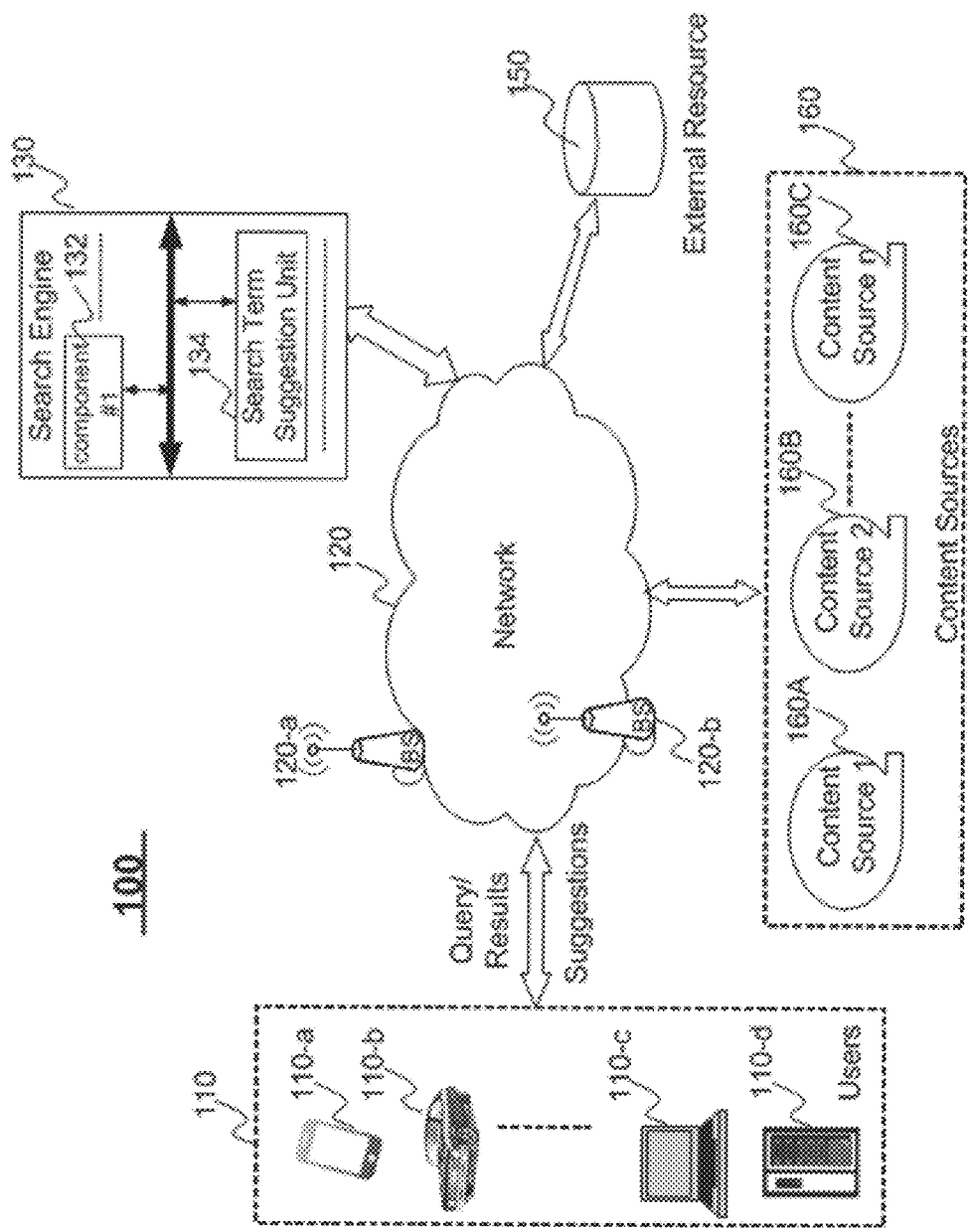
FIGS. 1A-1C illustrate a high level depiction of exemplary systems in which enhanced query term suggestion is applied in accordance with the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to systems, methods, medium, and other implementations directed to enhancing query term suggestion based on degrees of similarities with respect to a search context in which an incomplete search term is entered. The present teaching may be realized as a specialized and networked system by utilizing one or more computing devices (e.g., mobile phone, personal computer, etc.) and network communications (wired or wireless). The disclosed teaching on enhanced query term suggestion includes, but not limited to, an online process and system that in situations where a user may enter query terms from a client computing platform associated with the user. The progress of the user entering the query term may be monitored by recording the incomplete query terms as being input by the user towards the corresponding complete query term. The recorded incomplete query terms may contain a prefix and may be forwarded to a search system, which may suggest query terms that can be selected by the user to complete the query.

At the search system, for providing the enhanced query term suggestion in accordance with the present teaching, storage of query terms historically entered by the user and/or other users may be established. The storage of query terms may contain individual entries corresponding to particular query terms that were entered by the user and/or other users historically. An individual entry may be associated with a number of attributes including frequencies (e.g., a total number of times during a time period) a historical query term was entered by the user and/or other users, a feature list associated with that corresponding query term. The feature list may specify whether a number of unique entities (e.g., phrases, terms, topics, categories or any other entities) appear in a search context of that historical query term. In some implementations, to improve processing efficiency, a signature of the feature list may be stored in association with the historical query term.

After a prefix in an incomplete query term is received, the search system may obtain a set of candidate query terms for suggestions, which may contain the prefix of the incomplete query term received. Rankings of the candidate query terms may be determined by taking into consideration of degrees of similarities between the candidate query terms and the query terms in the same search session as the incomplete search term received. To achieve this, the search system may obtain a set of one or more query terms in the same search session as the incomplete search term. For the individual ones of the candidate query terms and as well as the query terms in the same search session as the incomplete query term received, the search system may obtain the feature lists or the signatures from the storage. Using the feature lists or the signatures, the search system may compute degrees of similarities of the individual candidate query terms with respect to the query terms in the same search session as the received incomplete search term. Based on such degrees of similarities of the individual candidate query terms, the candidate query terms may be ranked. For example, the degrees of similarities of the individual candidate query terms may be ranking factors among other ranking factors and may be used to rank the candidate query terms. With their rankings, the candidate query terms may then be provided to the user as query term suggestions.

As used herein, an intended query term may be referred to as a query term intended by a user for a search engine to execute and to return a list of information matching the query term.

As used herein, an incomplete query term may be referred to as a query term that is partially input by a user. As such, an incomplete query term may or may not constitute a part of the intended query term actually meant by the user. For example, there are situations in which the user may misinput (e.g., skip, unnecessarily add, and/or use wrong letter/characters) when entering an incomplete query term.

As used herein, an input sequence of an incomplete query term by a user may be referred to as a sequence of letters while the user entering the incomplete query term. It should be appreciated that a user may enter an incomplete query term using any suitable input means, such as, but not limited to, key strokes enabled by a physical keyboard, finger tapping enabled by a virtual keyboard, finger swiping enabled by a touch pad, voice commands enabled by a voice recognition service, stylus writing enabled by a touch pad, and/or any other input means. It should also be appreciated that the input sequence of an incomplete query term may not necessarily be limited to one letter at a time. For example, it is understood that an input sequence by, e.g., swipe typing or suggested typing may be used by a user to input multiple letters into an incomplete query term at a time. It is also understood that, although various examples illustrated in this disclosure are English based query terms, the present teaching is not limited to English based query terms. For example, the present teaching may be applied to an input sequence of an incomplete query term in any language, such as Spanish, German, French, Chinese, Korean, Japanese, Greek, Latin, and Hindi. The present teaching is also not limited to linguistically meaningful input and may include any commonly known meaningful sequence of symbols, such as math symbols, chemistry symbols, and/or any other types of inputs of letters, alphabets or characters, and numerals that may be used in human communications.

As used herein, the terms "letter", "alphabet", "character" may be used interchangeably in the context of a query term to mean a singular constituting part of a query term.

Figure 1B:
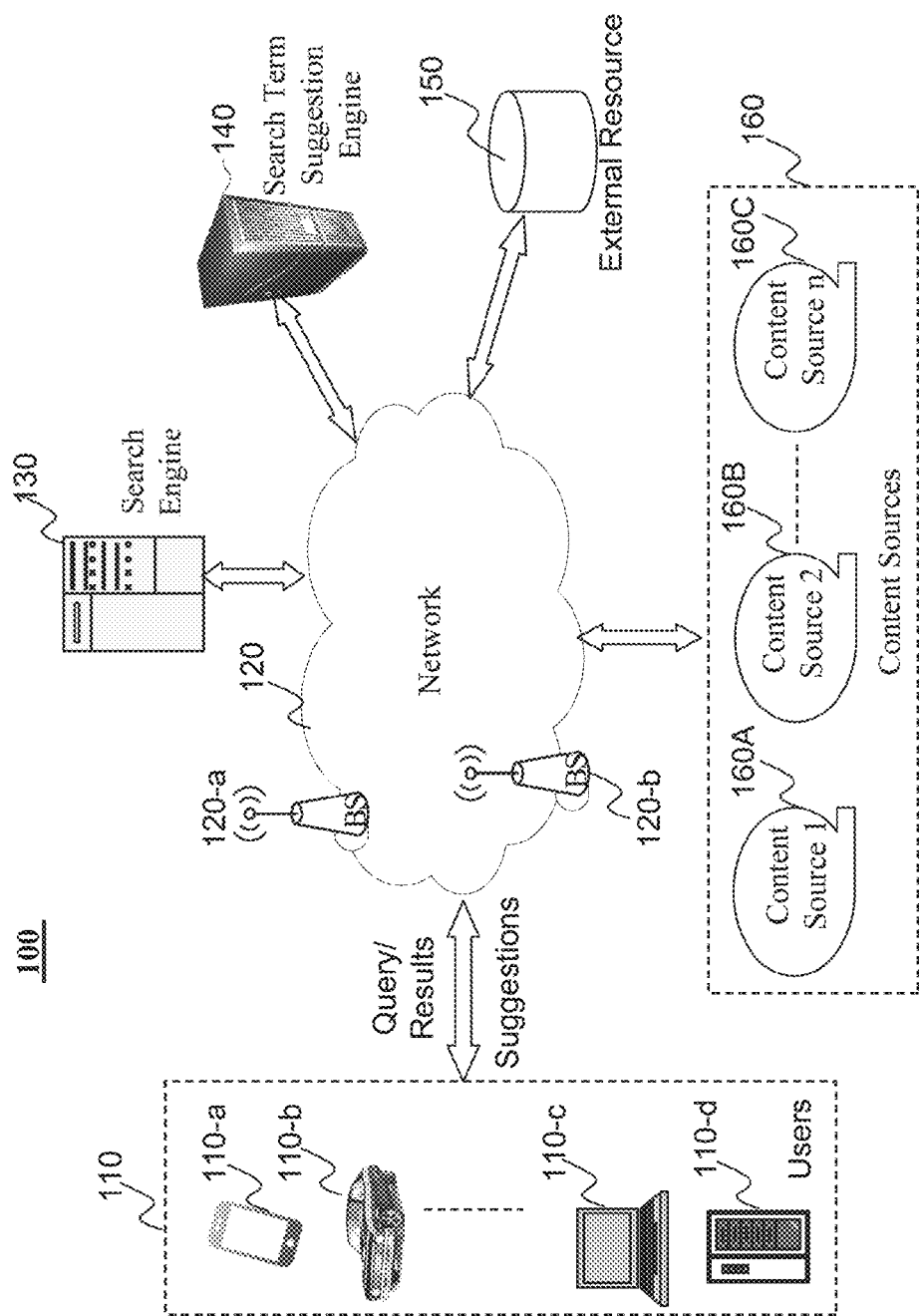
Figure 1C:
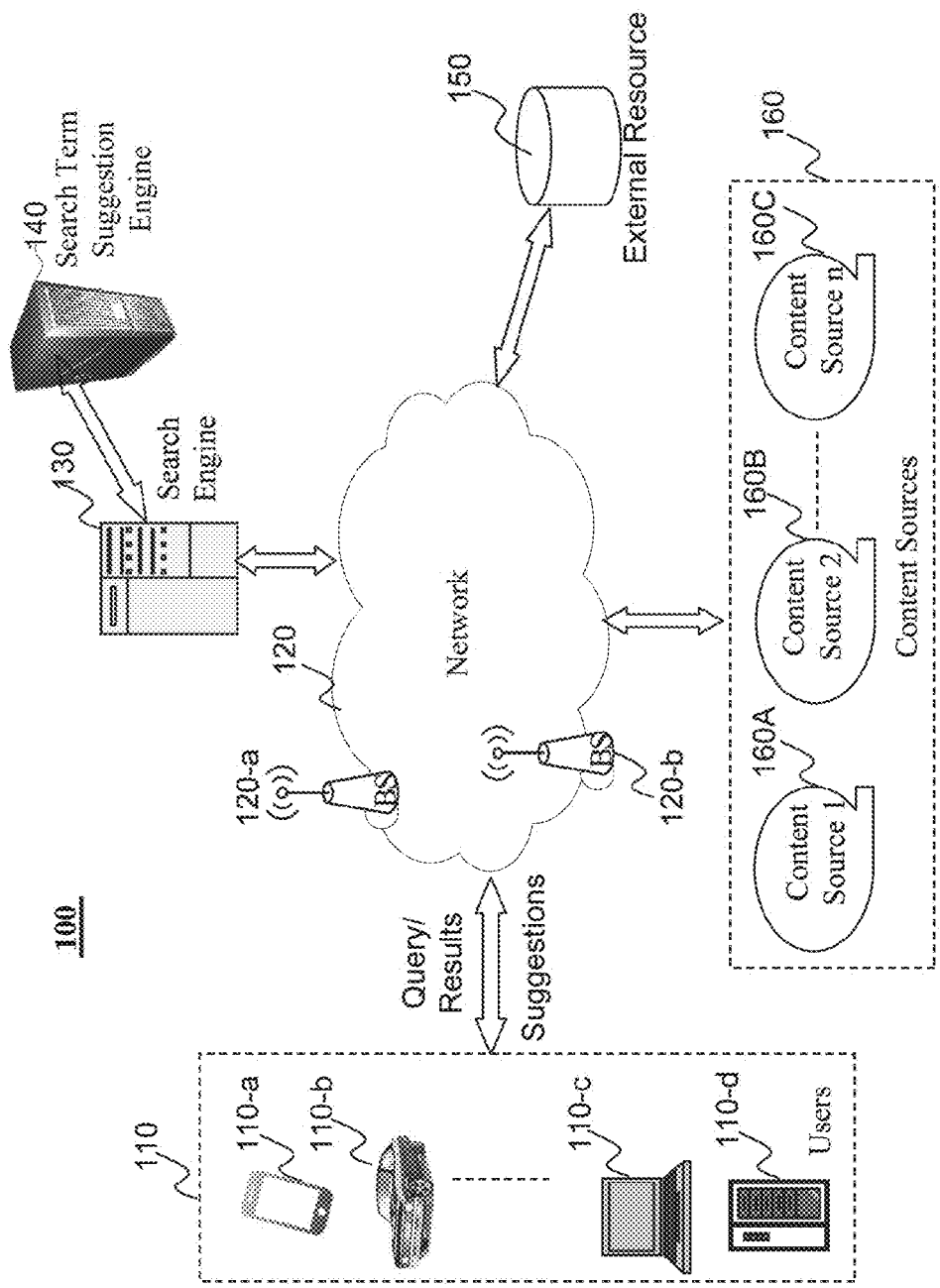

FIGS. 1A-1C illustrate exemplary system configurations in which enhanced query term suggestion can be deployed in accordance with various embodiments of the present teaching. In FIG. 1A, the exemplary system 100, as shown, includes users 110, a network 120, a search engine 130, content sources 160, external resource(s) 150, content sources 160 and other components (if any). The network 120 in system 100 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 120-a, . . . , 120-b, through which a data source may connect to the network in order to transmit information via the network.

Users 110 may be of different inputs such as users connected to the network via desktop connections (110-d), users connecting to the network via wireless connections such as through a laptop (110-c), a handheld device (110-a), or a built-in device in a motor vehicle (110-b). A user may send a query to the search engine 130 via network 120 and receive a query result from the search engine 130 through network 120. Based on the query received from the user, as illustrated in FIG. 1A, query term suggestions may be returned to the user to aid the user to complete or fine tune the query.

The exemplary system 100 as shown in FIG. 1A includes a search engine 130, which may include various components including a query term suggestion unit 134. As illustrated in FIG. 1A, these components in the search engine 130 may operate and communication with each other via a bus or buses included in the search engine 130. The query term unit 134 may be configured to provide enhanced query term suggestion in accordance with the present teaching. It should be understood the architecture with respect to providing enhanced query term suggestion in accordance with the present teaching is not limited to that shown in FIG. 1A. For example, FIG. 1B illustrates another architecture by which enhanced query term suggestion in accordance with the present teaching may be provided. As shown in FIG. 1B, the functionality attributed to query term unit 134 may be provided by a query term suggestion engine 140, which may be discrete and separate from the search engine 130 as shown. As illustrated, the query term suggestion engine 140 may be connected to the search engine via network 130. In one example, the search engine 130 may employ query term suggestion engine 140 by forwarding query terms to the query term suggestion engine 140 and receiving query term suggestions from the query term suggestion engine 140. FIG. 1C illustrates yet another architecture by which enhanced query term suggestion in accordance with the present teaching may be provided. As shown in FIG. 1C, the query term suggestion engine 140 may be operatively connected to the search engine 130 via a suitable communication channel. For example, the query term suggestion engine 140 and the search engine 130, as shown in FIG. 1C, may be located in the same server rack cabinet, or the same server room.

The external resources 150 may include sources of information, hosts and/or providers of Internet services outside of system 100, external entities participating with system 100, and/or other resources. In some implementations, some or all of the functionality attributed herein to external resources 150 may be provided by resources included in system 100. Examples of external resources may include data resources provided by third party content providers, Internet services provided by third party internet service providers, advertisement servers, and/or any other inputs of resources provided by participants external to system 100.

The content sources 160 may include multiple content sources 160-a, 160-b, . . . , 160-c. A given content source 160 may correspond to a web page host corresponding to an entity, whether an individual, a business, or an organization such as USPTO.gov, a content provider such as cnn.com and Yahoo.com, or a content feed source such as tweeter or blogs. The search engine 130 may access information from any of the content sources 160-a, 160-b, . . . , 160-c and rely on such information to respond to a query (e.g., the search engine 130 identifies content related to keywords in the query and returns the result to a user). Similarly, the query term suggestion engine 140 may access additional information, via network 120.

In the exemplary system 100 shown in FIGS. 1A-C, a user may inquire about certain information by entering query term for a client computing platform such as 110-a to 110d. For example, the user may inquire about "what is the best movie 2014" by entering a query term indicating such from a client computing platform 110. The query term suggestion unit 134 (FIG. 1A) or the query term suggestion engine 140 (FIGS. 1B-C) may receive a set of incomplete query terms as the user enters the query term. The set of incomplete query terms may indicate a sequence of the query term as being entered by the user. Based on this sequence, the query term suggestion unit 134 or the query term suggestion engine 140 may determine query term suggestions for presentation on the user client computing platform 110.

Figure 2:
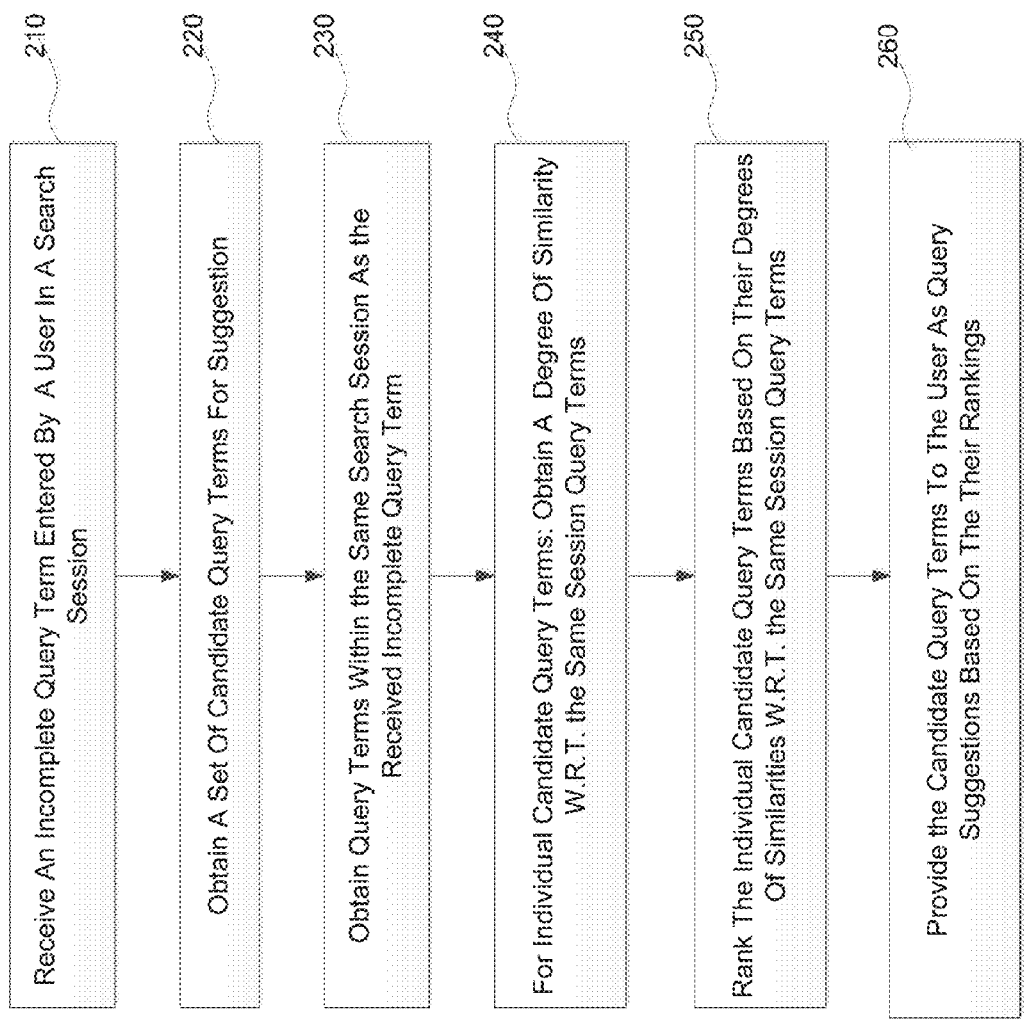
FIG. 2 is a flowchart of an exemplary process of determining candidate query terms for suggestion in accordance with one example of the disclosure.

FIG. 2 is a flowchart of an exemplary process of determining candidate query terms for suggestion in accordance with one example of the disclosure. It will be described with reference to FIGS. 1A-C. As shown, at 210, an incomplete query term entered by a user in a search session may be received. The incomplete query term may indicate a partially entered sequence of a query term intended by the user for inquiring about related information. For example, the incomplete query term may be partially entered by the user before the user engages an inquiry represented by the intended query term (complete)—for example, by hitting the "search button" provided by a graphical user interface implemented on the client computing platform 110. As such, the incomplete query term received at 210 may contain a prefix of the query term intended by the user.

In some implementations, a client program module such as a user input monitor (e.g., keystroke monitor) may be installed on the client computing platform to monitor user progress of entering a query term (character(s)/letter(s) by character(s)/letter(s)). In those implementations, a progress of user entering the query term may be reported to the search engine 130 (FIG. 1A) and/or the query term suggestion engine 140 (FIGS. 1B-C). By way of non-limiting example, individual one of the letters in the query term "what is the best Oscar movie 2014" may be reported to the search engine 130 and/or the query term suggestion engine 140 sequentially as they are being entered by the user on the client computing platform. However, it should be appreciated that the incomplete query term may be received in some other ways that are not necessarily "real-time" as described above. For example, the incomplete query term may be received from a database in which historical query terms may be stored in association with corresponding users.

It should be appreciated the term "search session" used herein may be defined by developer(s), provider(s), administrator(s) of, and/or any other entities related to system 100 in a number of ways. For example, without limitation, a search session may be defined as group of predetermined number of search terms with respect to a given query term of interest. As an illustration, a search session may contain 50 query terms entered by a user immediately before a current query term entered by the user. As another example, a search session may be defined as predetermined time period with respect to given query term of interest. As an illustration, a search session may be a 10 minute period starting or ending at a current query term entered by the user. Other definitions of a search session are contemplated. For example, it is understood that a search session may be defined as a logic grouping of a predetermined number of user activities for interacting with the search engine 130.

It should also be appreciated that search session used herein is not necessarily limited to a current session. That is, a search session may be historical. For example, a search session with respect to a particular query term entered by a user at a past time point may refer to a 10 minute search session ending at that past time point, if a time period based definition of a search session is used as described above. In this sense, the term "search session" is associated with a reference query term, i.e., the query term of interest and reflects a logical grouping of search terms as defined by the "search session".

At 220, a set of one or more candidate query terms may be obtained for suggestion to aid the user to complete the query. The operation at 220 may include obtaining a number of query terms that were entered by the user and/or other users similar to the user historically. In implementations this may involve examining query terms that were entered by the user and/or other users similar to the user, narrowing in on those query terms that contain the prefix in the incomplete query term received at 210, and select a set of candidate query terms for suggestion based on their frequencies appearing in the historical searches engaged by the user and/or other users, and/or any other sub-operations.

At 230, query terms within the same search session as the received incomplete query term may be obtained. This may involve retrieving from a session storage query terms entered by the user during the same session as the incomplete query term received at 210. As discussed above, the duration of the session and/or the length of the session may be defined using a predetermined time period, a number of query terms, a number of user activities, and/or any other constructs At 240, a similarity between each of the candidate query terms obtained at 220 and the query terms obtained at 230 may be determined. The operation(s) at 240 may include, determining a similarity between a candidate query term and each of the query terms obtained at 230 and aggregating the similarities to generate an aggregated similarity indicative of the degree of similarity between the candidate query term and the query terms obtained at 230. In some examples, the aggregated similarity may be obtained based on a function, including for example, a summation function, a weighted sum function, and an average function.

At 250, the individual candidate query terms may be ranked based on their degrees of similarities with respect to the query terms obtained at 230. At 260, the candidate query terms may be provided to the user as query suggestions based on their rankings determined at 250.

Figure 3:
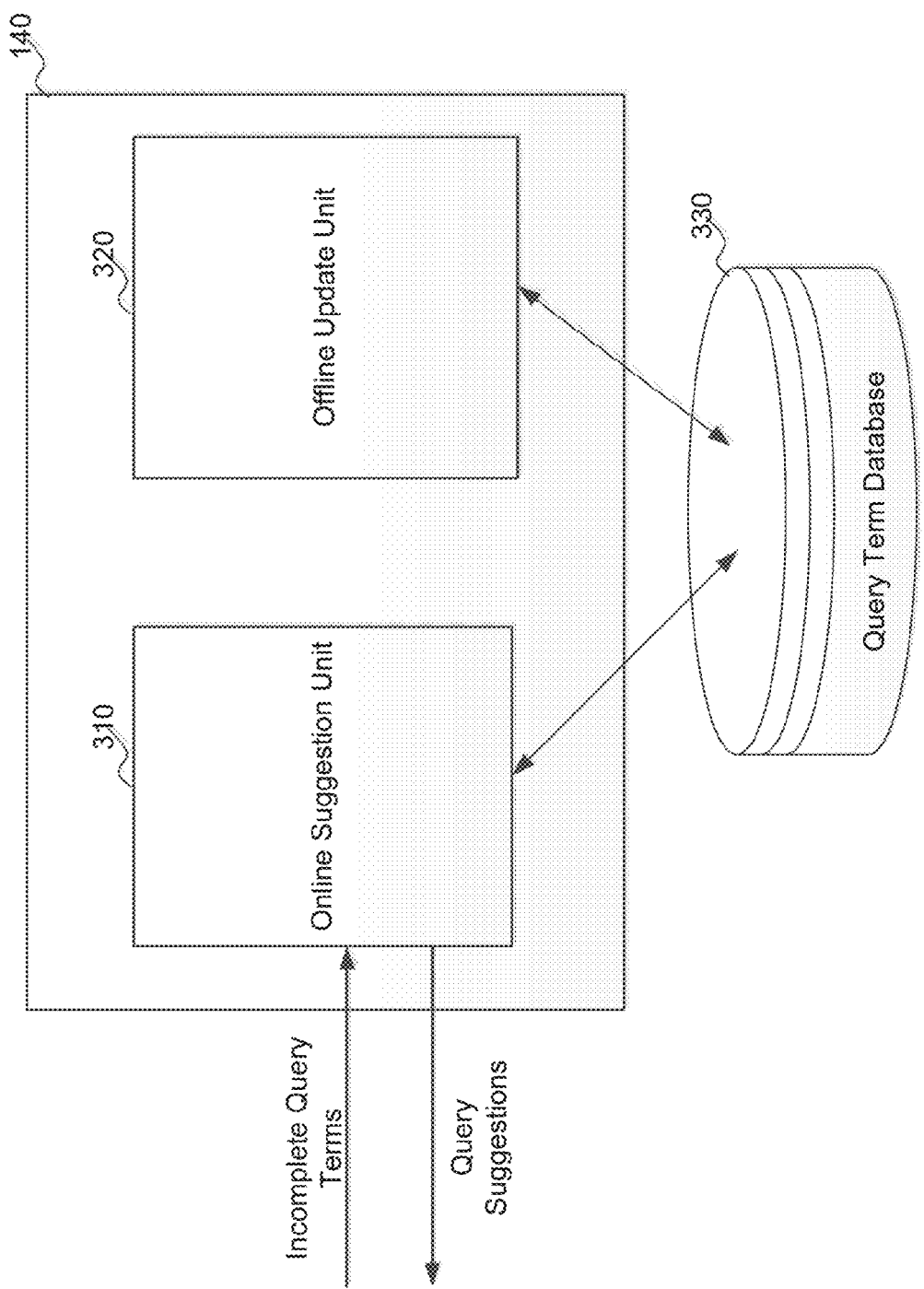
FIG. 3 illustrates, at a high level, one example of query term suggestion engine shown in FIG. 1 in accordance with one example of the present teaching.

FIG. 3 illustrates, at a high level, one example of query term suggestion engine shown in FIG. 1 in accordance with one example of the present teaching. It will be described with reference to FIGS. 1-2. As shown in this example, the query term suggestion engine 140 shown in FIG. 1 may include an online suggestion unit 310, an offline update unit 320, and/or any other components. As shown, the online suggestion unit 310 may be configured to receive incomplete query terms as inputs and determine query suggestions by consulting a query term database 330. As also shown, the offline update unit may be configured to update (i.e., add, delete, modify) entries in the query term database 330.

Figure 4:
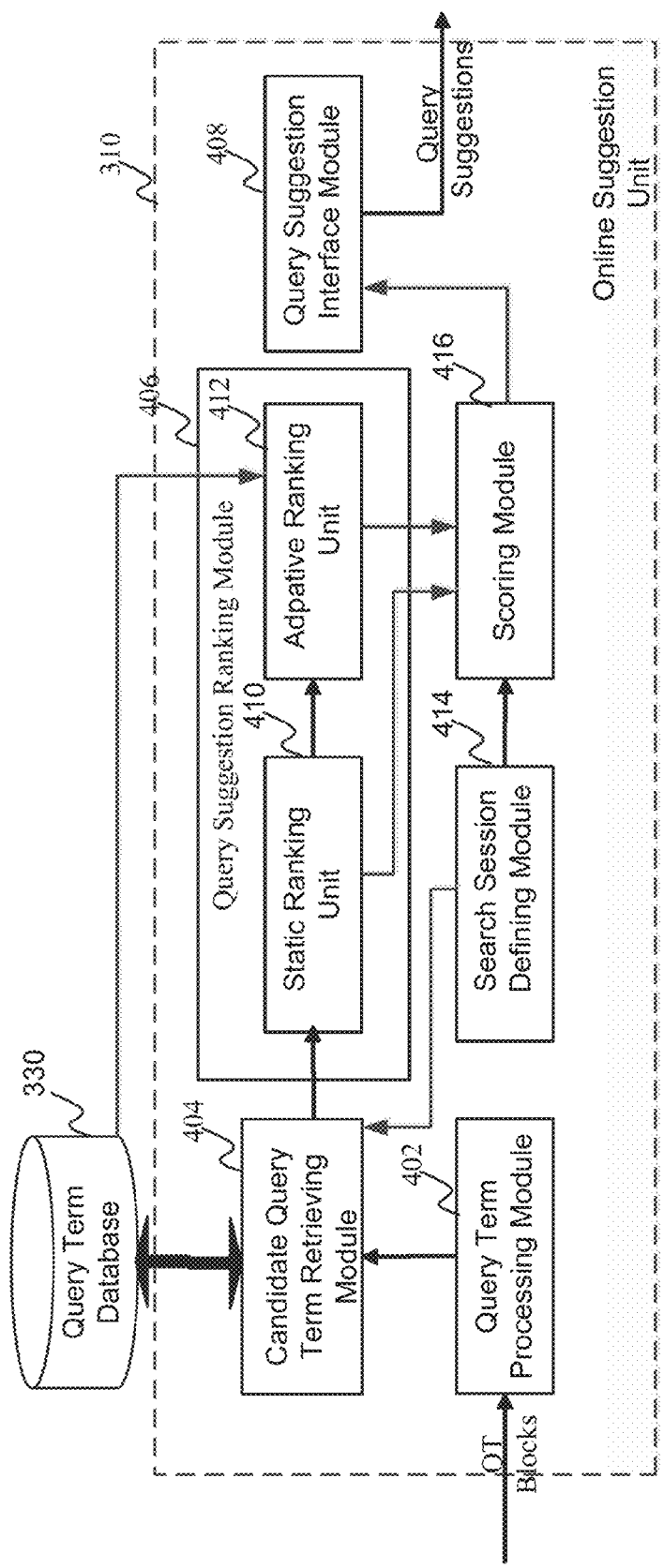
FIG. 4 is an exemplary diagram of an online suggestion unit shown in FIG. 3, according to an embodiment of the present teaching.

FIG. 4 is an exemplary diagram of an online suggestion unit shown in FIG. 3, according to an embodiment of the present teaching. It will be described with reference to FIG.

3. In this embodiment, the online suggestion unit 310 includes a query term processing module 402, a candidate query term retrieving module 404, a query suggestion ranking module 406, a query suggestion interface 408, and a scoring module 416. The query term processing module 402 in this embodiment is configured to receive query term blocks entered by a user, which may include incomplete query terms entered by the user. As described above, a given incomplete query term received by the query processing module 402 may include a prefix of a complete query term intended by the user. Based on this prefix, the candidate query term retrieving module 404 may be configured to obtain candidate query terms from the query term database 330. In this embodiment, query suggestion database 330 is configured to store pre-indexed entries with a number of attributes including a query term string, a display string, a frequency count indicating a number of times the query string has been entered by corresponding user or users, a feature vector, and/or any other attributes. The query term database 330 may be updated by the offline date unit 320. As described above, the candidate query term retrieving module 404 may be configured to retrieve, from the query term database 330, N number of candidate terms that contain the prefix received by the query term processing module 402, and that entered most often by the user and/or other users (similar to the user) in a past time period however desired. The past time period may be dynamically configured into the candidate query retrieving module 404.

As shown, the online suggestion unit 310 may include a query suggestion ranking module 406, which may be configured to determine rankings of the candidate query suggestion terms retrieved by the candidate query term retrieving module 404. In this embodiment, the query suggestion ranking module 406 includes a static ranking unit 410 and an adaptive ranking unit 412. The static ranking unit 410 may obtain the initial rankings of the candidate query terms retrieved by the candidate query term retrieving module 404 based on the frequency information associated with each candidate query term. As mentioned above, the candidate query terms may have already been pre-indexed offline so that their initial rankings can be obtained by the static ranking unit 410 at the time when the candidate query term are retrieved from the query term database 330. The adaptive ranking unit 412, on the other hand, may be configured to dynamically and adaptively adjust the initial rankings of the query suggestions based on a number factors such as degrees of similarities of the candidate query terms with respect to query terms in a search session of interest, the user's previous interactions with at least one of the query suggestions that has been previously provided to the user in the search session of interest, and/or any other factors.

In this embodiment, the dynamic and adaptive ranking adjustment (re-ranking) is done at runtime when each time the query prefix is updated (e.g., a new character of the query is received) in a search session. It is understood that the ranking adjustment or re-ranking does not necessarily cause the change of the initial rankings from the static ranking unit 410. In this example, adaptive ranking scores may be used by the scoring module 416 in connection with the initial ranking scores of the query suggestions to determine whether the initial rankings of the query suggestions should be maintained or changed. In this embodiment, the query suggestion interface 408 provides the re-ranked query suggestions to the user. As also described above, the adaptive ranking unit 412 may be configured to re-rank the candidate query terms based on degrees of similarities of the candidate query terms with respect to query terms in the same search session with the incomplete query term received by the query term processing unit 402. In implementations, such degrees of similarities may be determined based on feature vectors of the candidate query terms, which may be created or updated by the offline update unit 320 shown in FIG. 3. Details of the offline update unit 320 and operation(s) that may be implemented by the offline unit 320 will be described below.

Figure 5A:
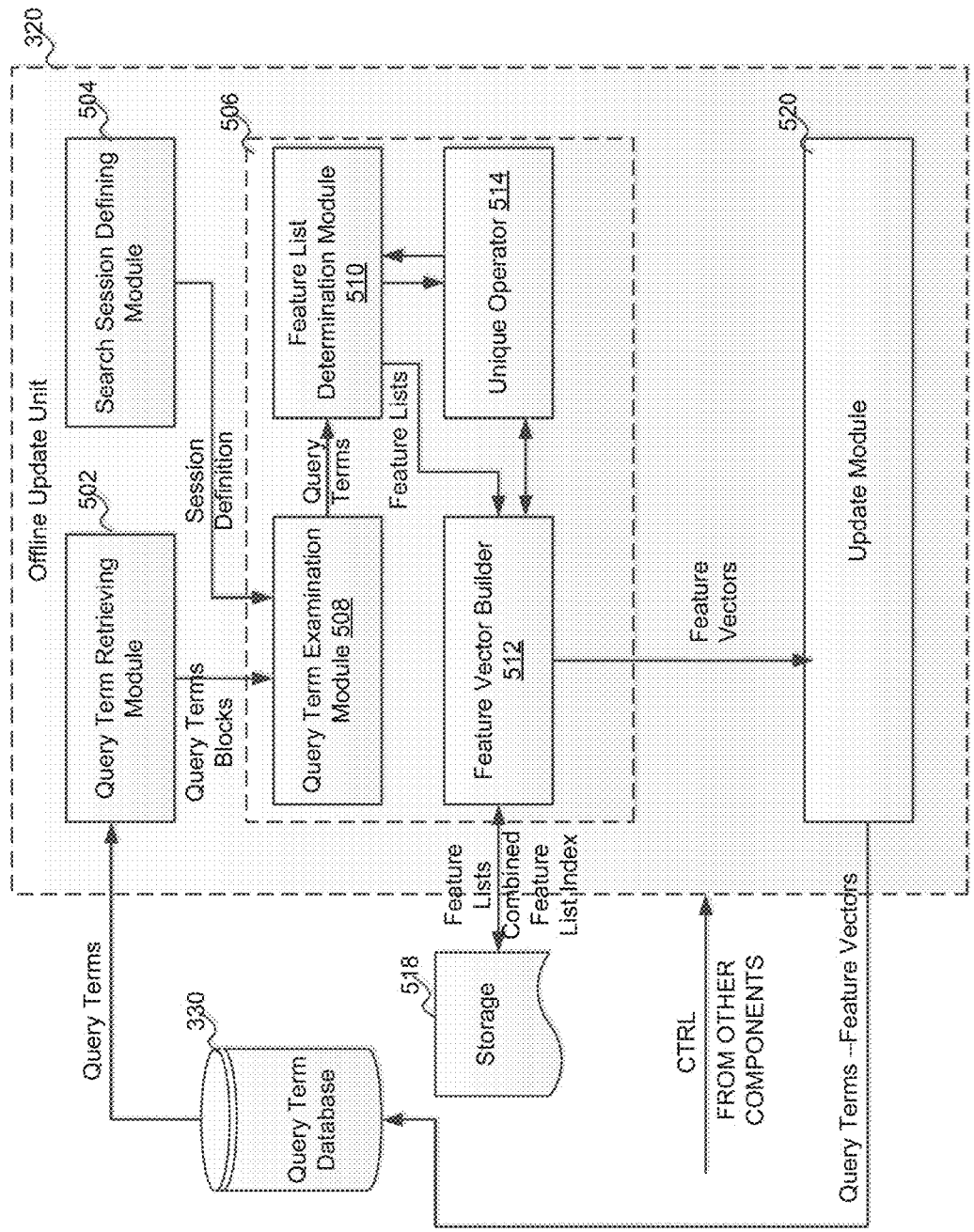
FIGS. 5A-B illustrate two examples of offline updating unit shown in FIG. 3, according to various embodiments of the present teaching.
Figure 5B:
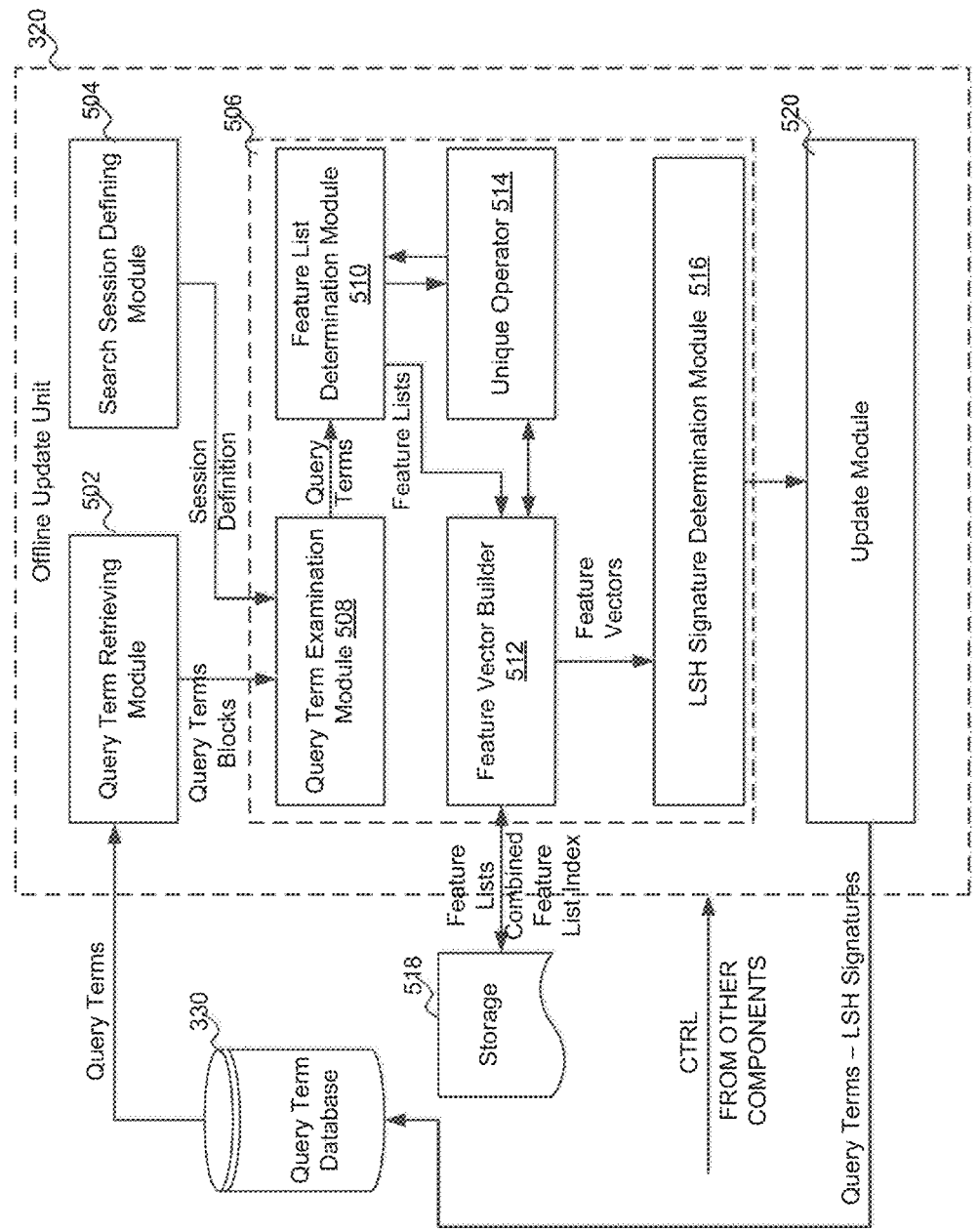

FIGS. 5A-B illustrate examples of offline updating unit shown in FIG. 3. It will be referenced with FIG. 3. As described above, the offline update unit 320 may be configured to update entries in the query term database 330. To achieve this, the offline unit 320 may be configured, as shown in this example, to include a query term retrieving module 502, a search session defining module 504, a feature list determination module 506, an update module 520, and/or any other modules. With references to FIGS. 6-12, the operations of these modules will be described.

As shown in FIG. 5, the query term retrieving module 502 may be configured to obtain query terms from the query term database 330. In some exemplary implementations, the query term retrieving module 502 may be configured to obtain query terms from the query term database 330 in blocks. For example, without limitation, the query term retrieving module 502 may retrieve 10,000 query terms from the query term database 330 on a single read. The search session defining module 504 may be configured to facilitate dynamically defining a search session as described above. For example, the search session defining module 504 may define a search session to be a 10-minute time period ending at a query term of interest.

Figure 6:
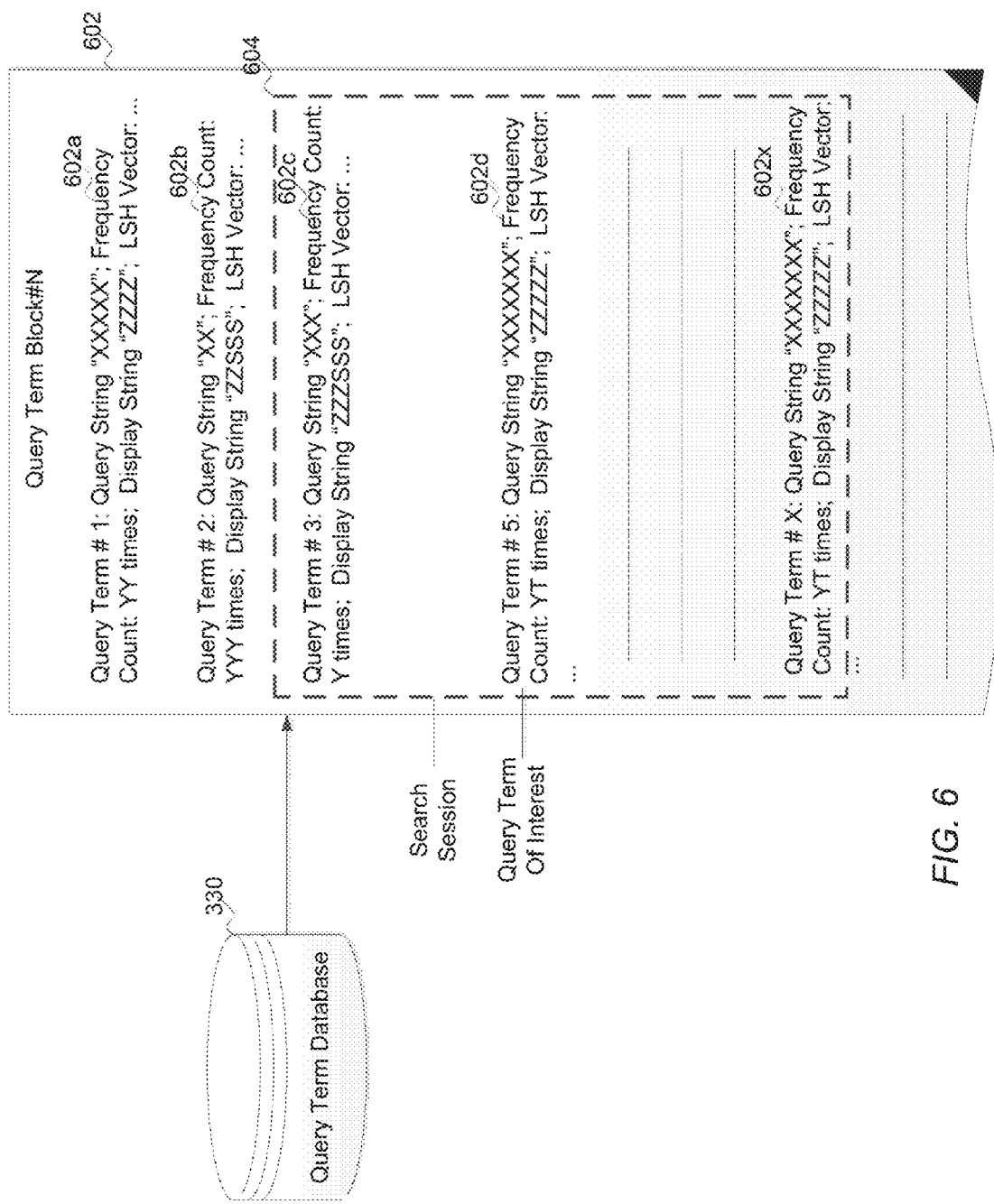
FIG. 6 conceptually illustrates the operation(s) performed by the query term examination module shown in FIGS. 5A-B, according to various embodiments of the present teaching.

As shown in FIG. 5, the query term blocks obtained by the query term retrieving module 502 and the search session definition information configured by the search session defining module 504 may be forwarded to the query term examination module 508 as inputs to the query term examination module 508. A conceptual illustration of the operation(s) performed by the query term examination module 506 is shown in FIG. 6. As shown in FIG. 6, a query term block 502 may contain a number of entries (e.g., 602a-x) corresponding to historically entered query terms. As shown, a given individual entry 602 may be associated with a number of attributes such as a query string representing a query term, a display string representing the query term in presentable formats (e.g., font, size, color, etc.), a frequency count indicating a number of times the query term was entered during a time period (e.g., the past hour, the past day, the past week, the past month, or any other time period however desired), a feature vector that will be described below in further detail, and/or any other attributes.

As shown in FIG. 6, a number of query terms in the same search session as a query term of interest may be obtained, for example, by the query term examination module 508. In this example, the query term of interest is the query term 602d. As shown, a number of query terms may be obtained using the search session definition provided by the search session defining module 504 for further processing, which is described below.

Returning to FIG. 5, the feature list determination module 510 may be configured to obtain a set of features from the query terms forwarded by the query term examination module 508. As used herein, a "feature" of a search term may be referred to as a word, a phrase, a sequence of letters, a topic, a category, and/or any other types of tokens that appear in the search term. The operation(s) performed by the feature list determination module 510 may involve tokenizing the query terms forwarded by the query term examination module 508 to obtain a set of tokens. As an illustration, let there be 1200 query terms in the same search session as a given query term. The individual query terms may contain one or more words, which may be defined semantically using a dictionary or non-semantically using a predetermined sequence (e.g., a query term may be divided into 5 characters long grams). The feature list determination module 510 may be configured to extract such words from the individual query terms into a pool of words. As shown, the feature list determination module 510 may be configured to instruct the unique operator 504, which may be configure to perform "unique" operation(s), to process and index the pool of words. With the pool of words indexed, the feature list determination module 510 may be configured to build a feature list therefrom. Still as an illustration, the 1200 query terms may be tokenized into 3000 unique words and a feature list to be associated with the given query term of interest may thus contain 3000 entries as follows: feature list for a given query term of interest={$<t_{1,1}$ attribute#1 . . . >, $<t_{1,2}$, attribute #1 . . . >, . . . $<t_{i,3000}$ attribute #1 . . . >}, where $t_{i,j}$ is the jth token in the 3000 tokens and is related to the ith query term in the pane deactivation component 120 query terms. The individual entry in the feature list may include an attribute identifying a corresponding unique word, an attribute of a frequency count indicating a number of times the corresponding unique word appearing in the query terms in the search session of interest, and/or any other attributes. In some examples, the feature list determination may be weighted. For example, without limitation, certain features may be considered more relevant than other features. Accordingly, those features may be given a corresponding multiplying factor such that the occurrence of such features in the query terms may be enlarged through the multiplying factor.

The feature vector builder 512 may be configured to build, for a given query term, a feature vector based on a feature list determined by the feature list determination module 510. As shown, the feature vector builder 512 may receive the feature lists determined by the feature list determination module 510 as input. As shown, in some implementations, the feature vector builder 512 may combine the received feature lists into a combine feature list index and store it in storage 518, such as an internal memory or any other temporary storage. As an illustration, for N number of query terms, the feature list determination module 510 may determine N feature lists. These feature lists may be forwarded to the feature vector builder 518, which may combine them into a combined feature list index of unique words. For example, the N number feature lists may contain M number of unique words in total and thus the combined feature list index may contain M number of indexes corresponding to those M unique words. To build a feature vector for a given query term of interest, the feature vector builder 512 may then construct an M dimension vector with each component being a value indicating the frequency of a corresponding one of the M unique words as indicated in the feature list associated with the given query term interest. The feature vector may be expressed as follows:

Feature Vector for a query term of interest-query term #$i$={$f_{i,1}, f_{i,2}, \ldots, f_{i,M}$}, where $f_{i,j}$ ($j=1 \ldots M$) is the frequency of a given feature as indicated in the feature list for the query term #$i$.

It is understood in some other implementations the feature vector created for a query term of interest may contain binary values (i.e., 0 and 1) simply indicating whether a corresponding one of the M unique words appearing in the feature list associated with the given query term interest. It is also understood the use of combined feature list index is not required for building a feature vector for a query term of interest. In some examples, a feature vector for a query term of interest may simply be the feature list determined by the feature list determination module 510.

As shown in FIG. 5A, the feature vectors determined by the feature vector builder 512 may be forwarded to an update module 520 for updating the query term database such that the individual query term entries in the query term database may be associated with a new or updated feature list as described above. It should be noted in some examples the feature vectors determined for a given query term of interest in this manner can be quite large in terms of storage size when the number of unique words in the feature list is large. Accordingly, in some implementations, a modified version of the offline update unit 320 may be implemented to account for such situations. This is illustrated in FIG. 5B.

FIG. 5B illustrates another example of the offline update unit 320. As can be seen, the difference between the offline units 320 shown in FIG. 5A and FIG. 5B is that the one in FIG. 5B includes a LSH determination module 516 and the update module 520 updates with query term database 330 using the LSH signatures instead of the feature vectors shown in FIG. 5A. LSH or Locality-Sensitive Hashing is a known concept. It is typically used to find similarity between two documents. Briefly, to achieve this, LSH compresses large documents into small signatures (LSH signatures as used herein) indicating corresponding "buckets" they belong to so that a similarity between any two documents may be found based on the signatures. Using this concept, a feature vector determined by the feature vector builder 512 for a given query term of interest may be compressed into small LSH signatures for later processing of finding similarities with respect to the any two query terms.

Figure 7:
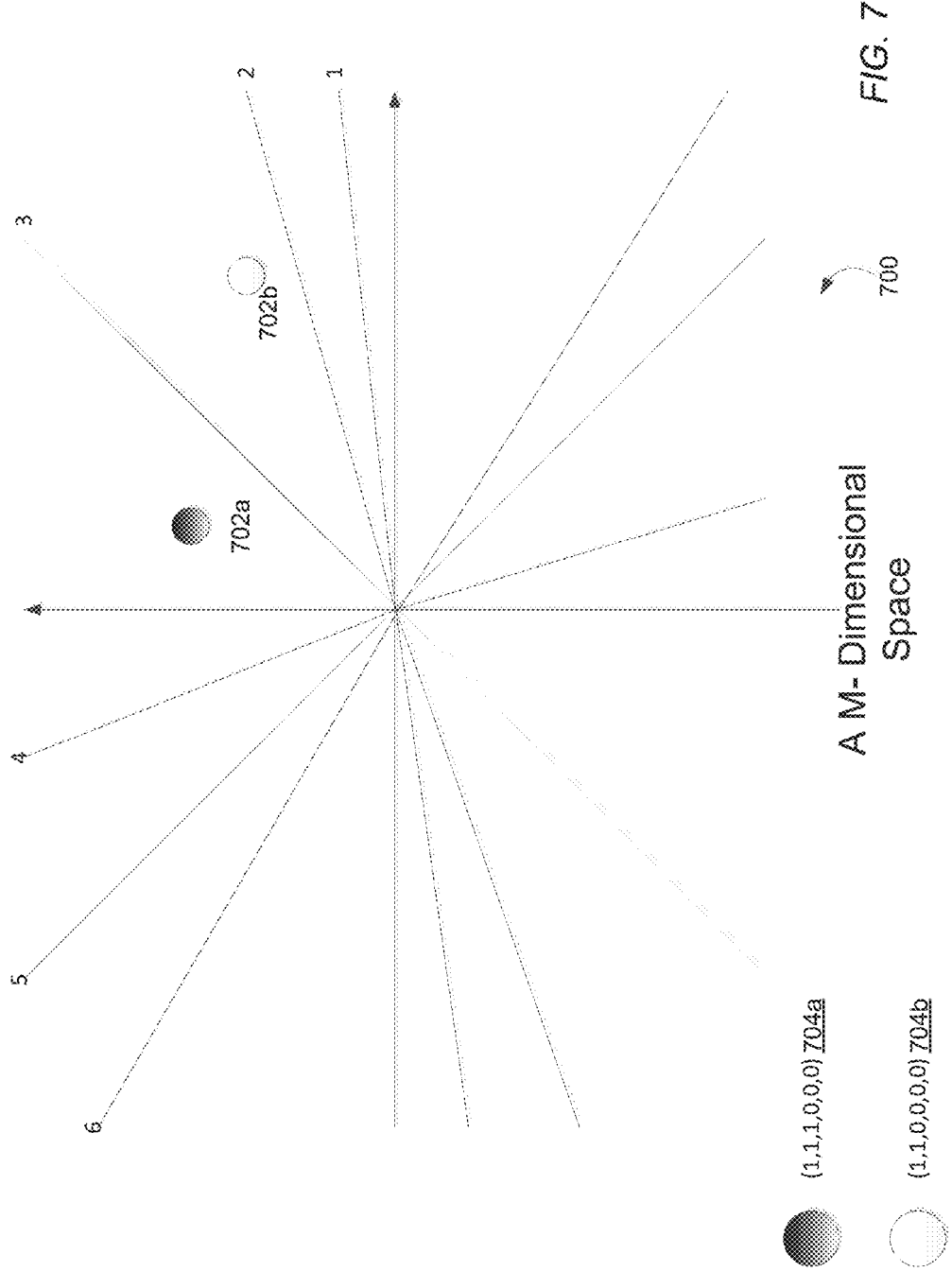
FIG. 7 conceptually illustrates compressing a M dimensional feature vector into a LSH signature, according to an embodiment of the present teaching.

FIG. 7 conceptually illustrates compressing an M dimensional feature vector into a LSH signature of length 6. As shown, 6 planes may be selected in an M-dimensional space 700. The two dots, 702$a$ and 702$b$, shown in FIG. 7 represent two M dimensional vectors placed into the M-dimensional space. As can be seen, the dots 702$a$ and 702$b$ may be compressed into LSH signatures 704$a$ and 704$b$ respectively. In this example, as shown, the individual values in the LSH signatures indicate whether the corresponding dot is above or below one of the 6 planes. For example, as an illustration, LSH signature 704$a$ indicates that the dot 702$a$ (a representation of an M dimensional vector in the M dimensional space 700) is above planes #1, 2 and 3, but is below planes #4, 5, 6. Likewise, LSH signature 704$b$ indicates that the dot 702$b$ (a representation of another M dimensional vector in the M dimensional space 700) is above planes #1, 2, but is below planes #3, 4, 5, 6.

Figure 8:
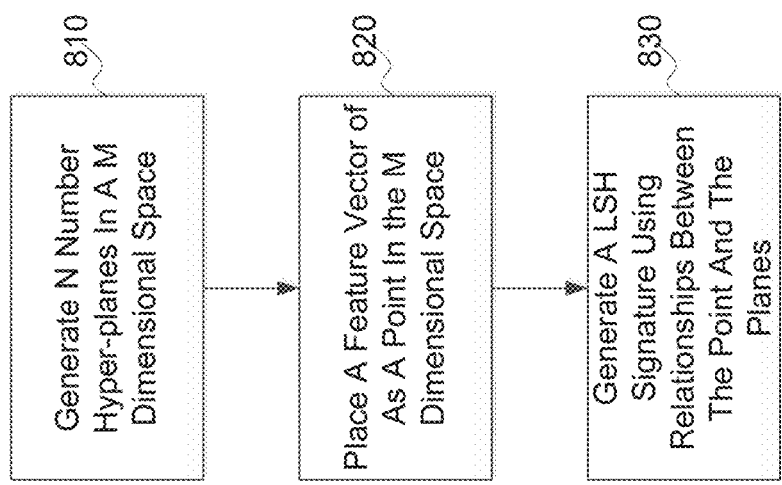
FIG. 8 illustrates an exemplary method for compressing an M dimensional feature vector into a LSH signature, according to an embodiment of the present teaching.

Returning to FIG. 5B, the LSH signature determination module 516 may be configured to compress a given M dimensional feature vector into a LSH signature. FIG. 8 illustrates one exemplary method for compressing an M dimensional feature vector into a LSH signature and may be implemented by the LSH signature determination module 516. As shown, at 810, N number of hyper-planes in an M dimensional space may be generated. In some implementations, the hyper-planes may be generated in the M dimensional space randomly or near-randomly. It is understood the number of hyper-planes that may be generated, i.e., N, may be any reasonable number suitable for application needs. However, there is a consideration between the accuracy and size when selecting an optimal number of hyper-planes for implementation. Empirically, it is found that 128 hyper-planes are optimal.

At 820, a feature vector that is determined by the feature vector builder 512 may be placed into the M-dimensional space as a point. At 830, an LSH signature may be determined based on the relationships between the point placed into the M-dimensional space at 820 and the N number of hyper-planes generated at 810. That is, an N size vector may be generated at 830 with the individual components indicating whether the point is above or below the N number hyper-planes.

Figure 9:
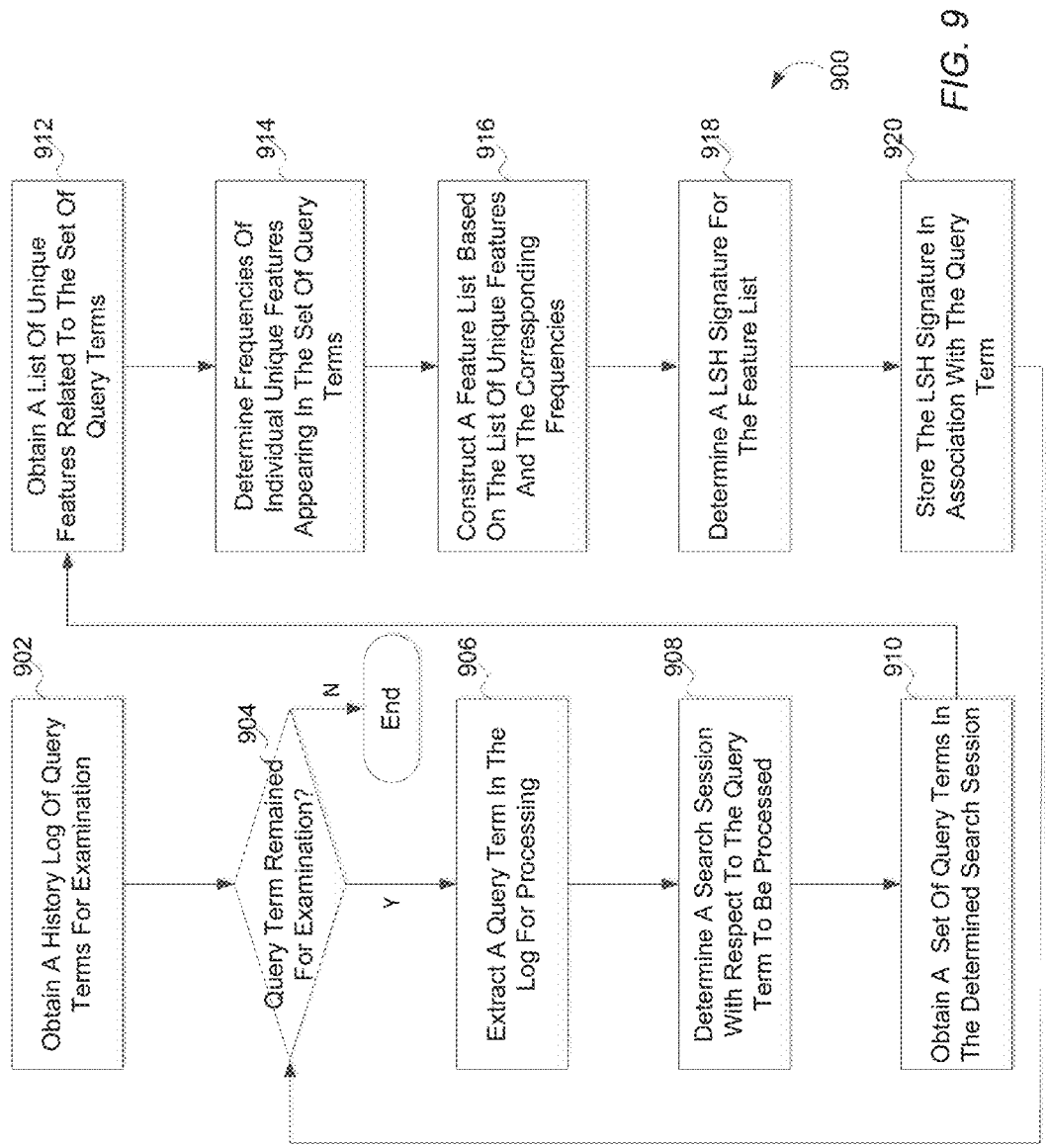
FIG. 9 illustrates an exemplary method for generating LSH signatures to be stored in association with corresponding query terms in accordance with the one embodiment of the disclosure.

FIG. 9 illustrates an exemplary method 900 for generating LSH signatures to be stored in association with corresponding query terms in accordance with the one embodiment of the disclosure. In some embodiments, method 900 may be accomplished with one or more additional operations not described, and/or without one or more of the operations discussed. Additionally, the order in which the operations of method 900 illustrated in FIG. 9 and described below is not intended to be limiting.

In some embodiments, method 900 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At 902, a history log of query terms may be obtained for examination. The history log obtained at 902 may include a number of query terms that were historically entered by a user or users. The query terms in the history log obtained at 902 may be indexed or sorted by time. In some exemplary implementations, the operation(s) performed at 902 may be implemented by a query term retrieving module substantially similar to or the same as the query term retrieving module 502 described and illustrated herein.

At 904, a decision whether there is at least one query term in the history log received at 902 is made. As shown, in the case there remains at least one query term in the history log, the method 900 proceeds to 906; and in the case there is no query term remaining the history log to be processed, the method 900 proceeds to end. In some exemplary implementations, the operation(s) performed at 904 may be implemented by a query term retrieving module substantially similar to or the same as the query term retrieving module 502 described and illustrated herein.

At 906, a query term may be extracted from the history log received at 902 for processing. In some exemplary implementations, the operation(s) performed at 904 may be implemented by a query term retrieving module substantially similar to or the same as the query term retrieving module 502 described and illustrated herein.

At 908, a search session may be determined with respect to the query term extracted at 906. For example, the search sessions determined at 908 may include a search session that is defined as a 10-minute time period centering at the query term extracted at 906—i.e., 5 minutes before the extracted query term and 5 minutes after the extracted query term. In some exemplary implementations, the operation(s) performed at 908 may be implemented by a search session defining module substantially similar to or the same as the query term retrieving module 502 described and illustrated herein.

At 910, a set of query terms in the search session determined at 908 may be obtained. In some implementations, the set of query terms obtained at 910 may include all query terms in the search session determined at 908. However, this is not necessarily the only case. In some other implementations, the set of query terms obtained at 910 may include some of the query terms in the search session determined at 908 as however desired. In some exemplary implementations, the operation(s) performed at 910 may be implemented by a query term examination module substantially similar to or the same as the query term examination module 508 described and illustrated herein.

At 912, a list of unique features related to the set of query terms may be obtained. As described above, the features obtained in step 912 may include words, phrases, topics, categories, and/or any other type of entities contained in the set of query terms or pertains to the set of query terms. In some exemplary implementations, the operation(s) performed at 912 may be implemented by a feature list determination module substantially similar to or the same as the feature list determination module 510 described and illustrated herein.

At 914, frequencies of the individual features appearing in the set of query terms may be determined during the search session. The operation(s) involved in step 914 may include counting a number of times the individual features have appeared in the set of query terms during the search session. As described above, in some implementations, appearances of certain features may be considered more important and may be enlarged by a multiplying factor (i.e., weighted). In some exemplary implementations, the operation(s) performed at 914 may be implemented by a feature list determination module substantially similar to or the same as the feature list determination module 510 described and illustrated herein.

At 916, a list of feature vectors may be constructed using the list of unique features obtained at 912 and the frequencies of the individual features in that list appearing in the set of query terms during the search session as determined at 914. In some examples, the operation(s) at 916 may simply involve associating the frequencies with the features list. In some other implementations, the operation(s) at 916 may involve mapping the frequencies and the unique features to an M size vector as described above. In some exemplary implementations, the operation(s) performed at 916 may be implemented by a feature vector builder substantially similar to or the same as the feature vector builder 512 described and illustrated herein.

At 918, an LSH signature may be determined for the feature list determined at 918. In some exemplary implementations, the operation(s) performed at 918 may be implemented by a LSH signature determination module substantially similar to or the same as the LSH signature determination module 516 described and illustrated herein.

At 920, the LSH signature determined at 918 may be stored in association with the query term extracted at 906. In some exemplary implementations, the operation(s) performed at 920 may be implemented by an update module substantially similar to or the same as the update module 520 described and illustrated herein.

Figure 10:
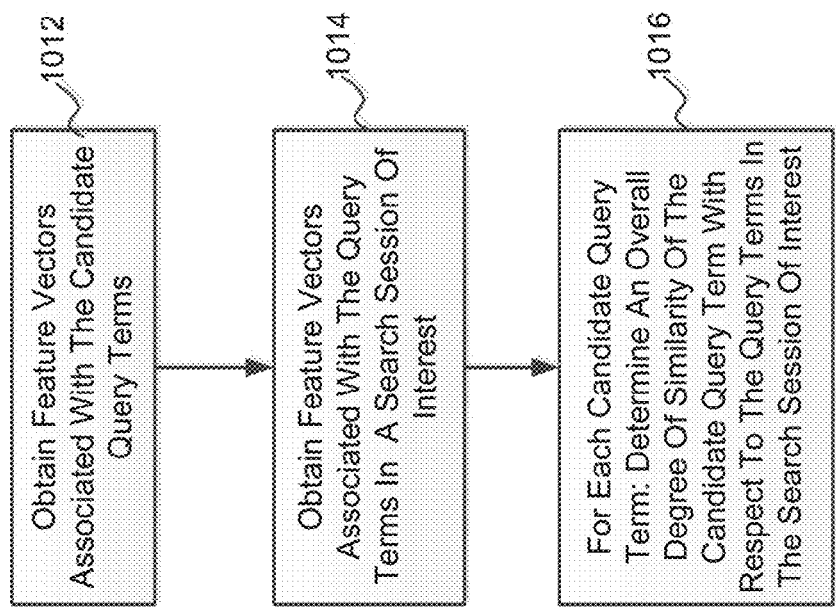
FIG. 10 illustrates an exemplary process that may be implemented by the adaptive ranking unit shown in FIG. 4, according to an embodiment of the present teaching.

Further detail about the adaptive ranking unit 412 shown in FIG. 4 will now be described. FIG. 10 illustrates an exemplary process that may be implemented by the adaptive ranking unit 412. At 1012, a feature vector associated with the individual ones of the candidate query terms may be obtained from the query term database 330. At 1014, feature vectors of the query terms previously searched in a search session of interest may be obtained. For example, the search session of interest may be the search session with respect to an incomplete query term having a prefix based on which query suggestion(s) will be made.

At 1016, for each candidate query term, an overall degree of similarity between the candidate query term and the query terms in the search session of interest may be determined. In some implementations, operation(s) at 1016 may include determining a separate degree of similarity of the candidate query terms with respect to a corresponding query term in the search session of interest, generating the overall similarity by aggregating the separate degree of similarities, and/or any other operations. A number of methods may be used to determine an overall degree of similarity between a candidate query term and the query terms in the search session of interest. For example, the following method is one of such examples and is expressed in pseudo-codes:

```
for a given candidate query term (q_c),
    for each query term (q_i) in the search session of interest
        correlation s_i = cosine_sim(Feature_Vector(q_c),
Feature_Vector(q_i), wherein cosine _sim( ) denotes a cosine similarity
function that is used to compute a similarity between two feature vectors
associated with q_c and q_i as shown.
```

Thus, using this example, the aggregated correlation score s (overall similarity) of $q_c$ with respect to the query terms in the search session of interest=$\Sigma_{i=1}^{N} S_i {}^* C_i/N$, where $C_i$ is a constant coefficient, $0 < C_i < 1$, and $C_i < C_j$ for $i < j$. It is understood that in some embodiments, the aggregated similarity may be obtained based on any suitable function, including for example, a summation function, a weighted sum function, and an average function. As noted above, there might be situations when the feature vectors for the query terms are large and sparse. In those situations, relying on feature vectors of query terms for determining similarity may not be efficient. To account for such situations, the similarities between query terms may be determined using their LSH signatures. This is illustrated in FIG. 11 and is described below.

Figure 11:
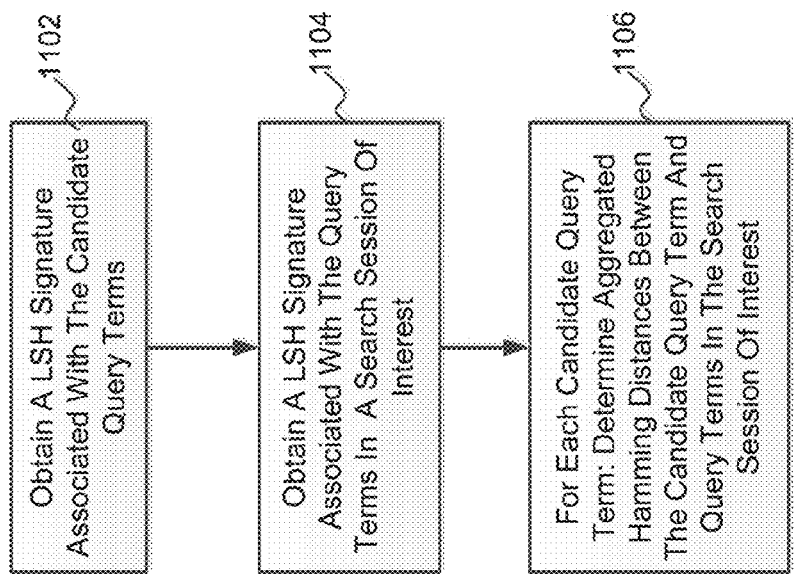
FIG. 11 illustrates an exemplary process for determining degrees of similarity between candidate query terms and query terms in a search session of interest based on the LSH signatures of the query terms, according to an embodiment of the present teaching.
Figure 12:
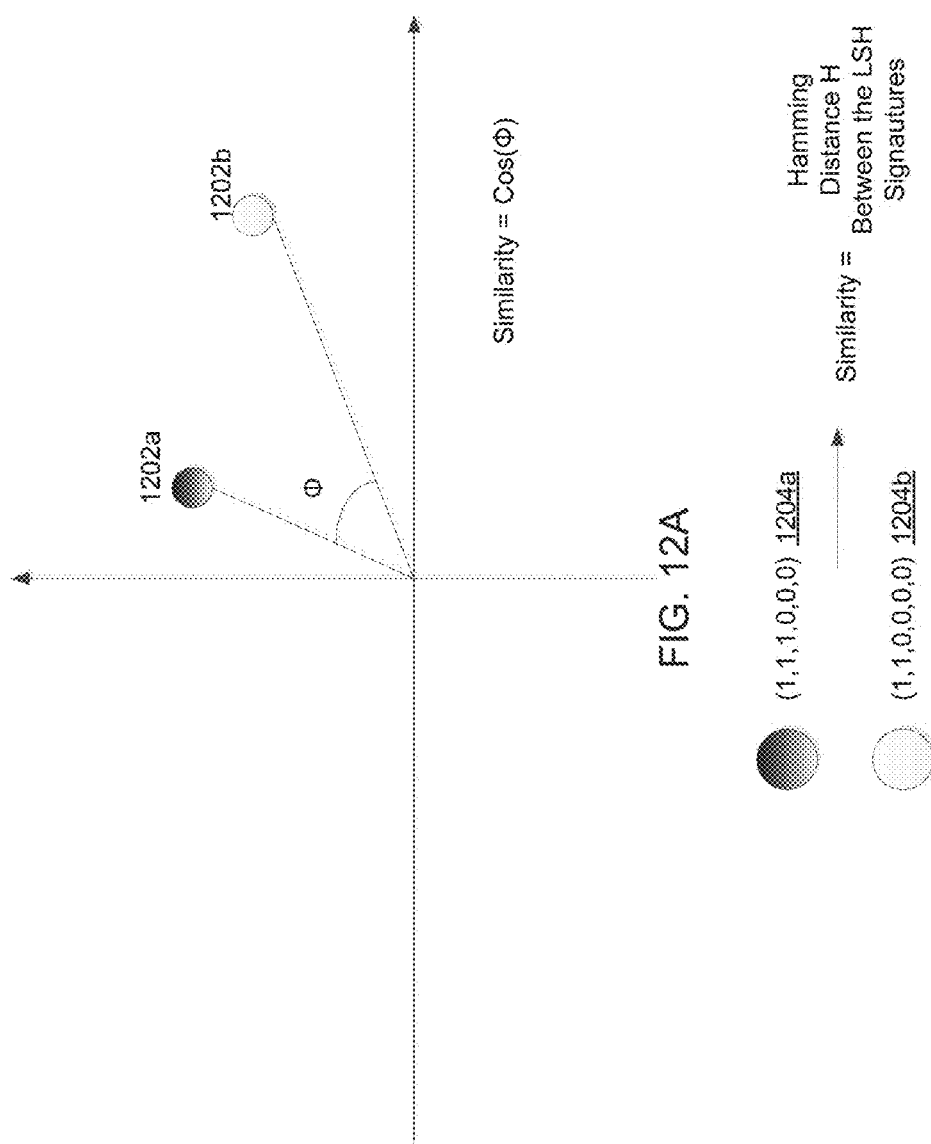
FIGS. 12A-B conceptually illustrate examples of determining similarities between two query terms, according to various embodiments of the present teaching.

FIG. 11 illustrates an exemplary process for determining a degree of similarity between a candidate query terms and query terms in a search session of interest based on the LSH signatures of the query terms. At 1102, an LSH signature associated with the individual ones of the candidate query terms may be obtained from the query term database 330. At 1104, an LSH signature of the query terms previously searched in a search session of interest may be obtained. For example, the search session of interest may be the search session with respect to an incomplete query term having a prefix based on which query suggestion(s) will be made. At 1106, an aggregated distance between the candidate query term and the query terms in the search session of interest may be determined for each candidate query term. The distance determined at 1106 may include a cosine distance, a hamming distance, a Euclidean distance, and/or any other type of distances between vectors. For example, the similarity between a candidate query term and query terms in the search session of interest may be determined by 1) computing a hamming distance between the LSH signature of the candidate query term and the LSH signature of each of the query terms in the search session of interest; and 2) generating an aggregated hamming distance by aggregating the hamming distances between the LSH signature of each of the query terms in the search session of interest. In that example, the aggregated hamming distance generated may be indicative of an overall similarity between the candidate query term and the query terms in the search session of interest. In implementations, computing a hamming distance between LSH signatures of two query terms may involve computing how many bits need to flip from one LSH signature to the other LSH signature—i.e., XOR'ing two LSH signatures, and counting the 1 bits of the result. By using LSH signatures, the re-rankings of the candidate query terms may be carried out, at least partially, based on the hamming distance as replacement of the cosine similarity calculation used in the case where feature list vector is used. In modern hardware, the computation of hamming distance based on LSH signatures can be very efficiently carried out by using SIMD instructions. For example, on x86-64 architecture, we can store LSH signatures in 128-bit SSE registers, and use "popcnt" instruction to get the number of 1 bits from the XOR results as illustrated above. In some embodiments, the similarity between two query terms may be determined by computing cosine distance or Euclidean distance using LSH signatures of the two query terms.

FIGS. 12A-B conceptually illustrate examples of determining similarities between two query terms. FIG. 12A illustrates the similarity between two query terms (e.g., a candidate query term and a query term in the search session of interest) may be determined using cosine similarity of two points, 1202a-b representing M size feature vectors of the two query terms. FIG. 12B illustrates the similarity between query terms may be determined using hamming distance between two LSH signatures, 1204a-b, of the query terms.

Returning to FIG. 4, the scoring module 416 may be configured to calculate the ranking scores for the candidate query terms. As shown, the scoring module 416 may be configured to receive static rankings of the candidate query terms and as well as the adaptive rankings of candidate query terms. In implementations, weighting factors may be configured into the scoring module 416 to take into consideration of biased scoring however desired. For example, in one implementation, the static rankings of the candidate query terms may be used and thus may be given boost factor(s) so that the static rankings may dominate in the final rankings of the candidate query terms. In another example, the similarity rankings described above, for example determined based on the hamming distances, may be used. In that example, boost factor(s) may be given to those rankings. In any case, the scoring module 416 may be configured to score the individual candidate query terms using the weighted rankings and obtain final rankings of the candidate query terms.

Query suggestion interface module 408 may be configured to generate an interface of query suggestions for presentation to the users. As can be seen, the query term suggestion interface module 408 may receive the final rankings (i.e., in the form of scores) of the candidate query terms and generate an interface to present the candidate query terms in accordance with the final rankings.

Figure 13:
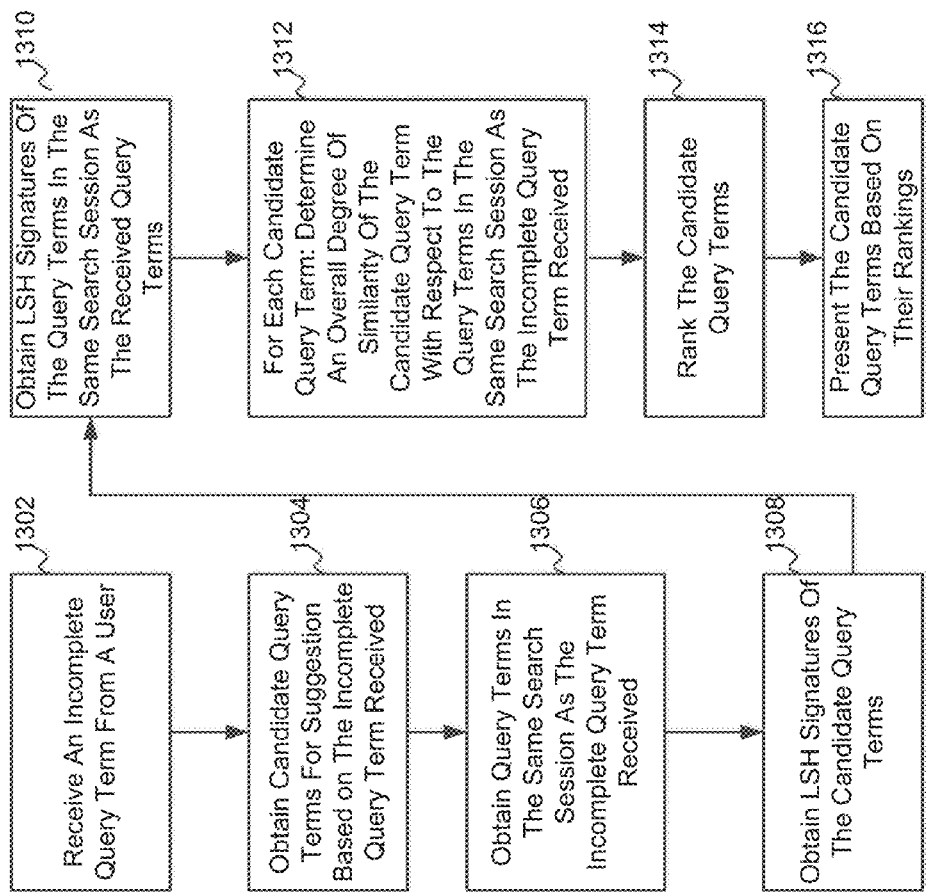
FIG. 13 illustrates an exemplary method for presenting query term suggestions in accordance with the one embodiment of the disclosure.

FIG. 13 illustrates an exemplary method 1300 for presenting query term suggestions in accordance with the one embodiment of the disclosure. In some embodiments, method 1300 may be accomplished with one or more additional operations not described, and/or without one or more of the operations discussed. Additionally, the order in which the operations of method 1300 illustrated in FIG. 13 and described below is not intended to be limiting.

In some embodiments, method 1300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1300 in response to instructions stored electronically on an electronic storage medium. The one or more processing devices may include one or more devices configured through hardware, firmware, and/or software to be specifically designed for execution of one or more of the operations of method 1300.

At 1302, an incomplete query term may be received from a user. The incomplete query term may contain a prefix of the query term intended to be completed by the user. In some exemplary implementations, the operation(s) performed at 1302 may be implemented by a query term processing module substantially similar to or the same as the query term processing module 402 described and illustrated herein.

At 1304, a set of one or more candidate query terms may be obtained for suggestion based on the incomplete query term received at 1304. In some exemplary implementations, the operation(s) performed at 1304 may be implemented by a candidate query term retrieving module substantially similar to or the same as the candidate query term retrieving module 404 described and illustrated herein.

At 1306, query terms in the same search session as the incomplete query term received at 1302 may be obtained. For example, the search sessions determined at 1308 may include a search session that is defined as a 10 minute time period immediately before the incomplete query term received at 1302. In some exemplary implementations, the operation(s) performed at 1306 may be implemented by a query suggestion ranking module substantially similar to or the same as the query suggestion ranking module 406 described and illustrated herein.

At 1308, LSH signatures of the candidate query terms may be received. It is noted in some situations, a LSH signature cannot be computed for a candidate query term obtained at 1304. For instance, a query candidate term obtained at 1304 may be newly entered by the user in a search session such that a feature vector described above has not been generated for the query candidate term offline yet. In those situations, 1308 simply receives nothing for such candidate query terms. In some exemplary implementations, the operation(s) performed at 1308 may be implemented by a query suggestion ranking module substantially similar to or the same as the query suggestion ranking module 406 described and illustrated herein.

At 1310, LSH signatures of the query terms obtained at 1306. Likewise, there may be situations LSH signatures cannot be computed for the query terms obtained at 1306, for example, because those query terms are entered by the user for the first time ever. In those situations, 1310 simply receive nothing for such query terms. In some exemplary implementations, the operation(s) performed at 1310 may be implemented by a query suggestion ranking module substantially similar to or the same as the query suggestion ranking module 406 described and illustrated herein.

At 1312, for each candidate query term, an overall degree of similarity between the candidate query term and the query terms in the same search session as the incomplete query term received at 1302 may be determined. This may involve 1) determining a similarity between a given candidate query term and each of the query terms in the same search session as the incomplete query term; and 2) generating an aggregated similarity for the given candidate query term by aggregating the similarities determined in 1). In some implementations, the aggregated similarity may be generated based on a function of the individual similarities determined in 1). For example, the aggregate similarity may be generated using one of a summation function, a weighted sum function, an average function, and any other function(s). For instance, in the case where the similarity between two query terms is determined using a distance e.g., a hamming distance between LSH signatures of the two query terms, the distance between the candidate query term and each of the query terms in the same search session as the incomplete query term may be weight summed (i.e., the distances are weighted and then aggregated). For example, the distances within certain thresholds may be given corresponding boost factors so that they may be given more weights when aggregated with other distances. It is noted, for candidate query term(s) obtained at 1304 and/or query term(s) obtained at 1306 whose LSH signatures cannot be received at 1308 and/or 1310 as described above, the computation of similarity involving those query terms as described in 1) above may be skipped. In some exemplary implementations, the operation(s) performed at 1312 may be implemented by a query suggestion ranking module substantially similar to or the same as the query suggestion ranking module 406 described and illustrated herein.

At 1314, candidate query terms may be ranked. The ranking performed at 1314 may include ranking the candidate query terms based on the overall similarities of the candidate query terms determined at 1312 and/or any other ranking parameters. In some exemplary implementations, the operation(s) performed at 1314 may be implemented by a scoring module substantially similar to or the same as the scoring module 416 described and illustrated herein.

At 1316, query suggestions may be provided to the user based on the rankings of the candidate query terms as determined at 1314. In some exemplary implementations, the operation(s) performed at 1316 may be implemented by a query suggestion interface module substantially similar to or the same as the query suggestion interface module 408 described and illustrated herein.

Figure 14:
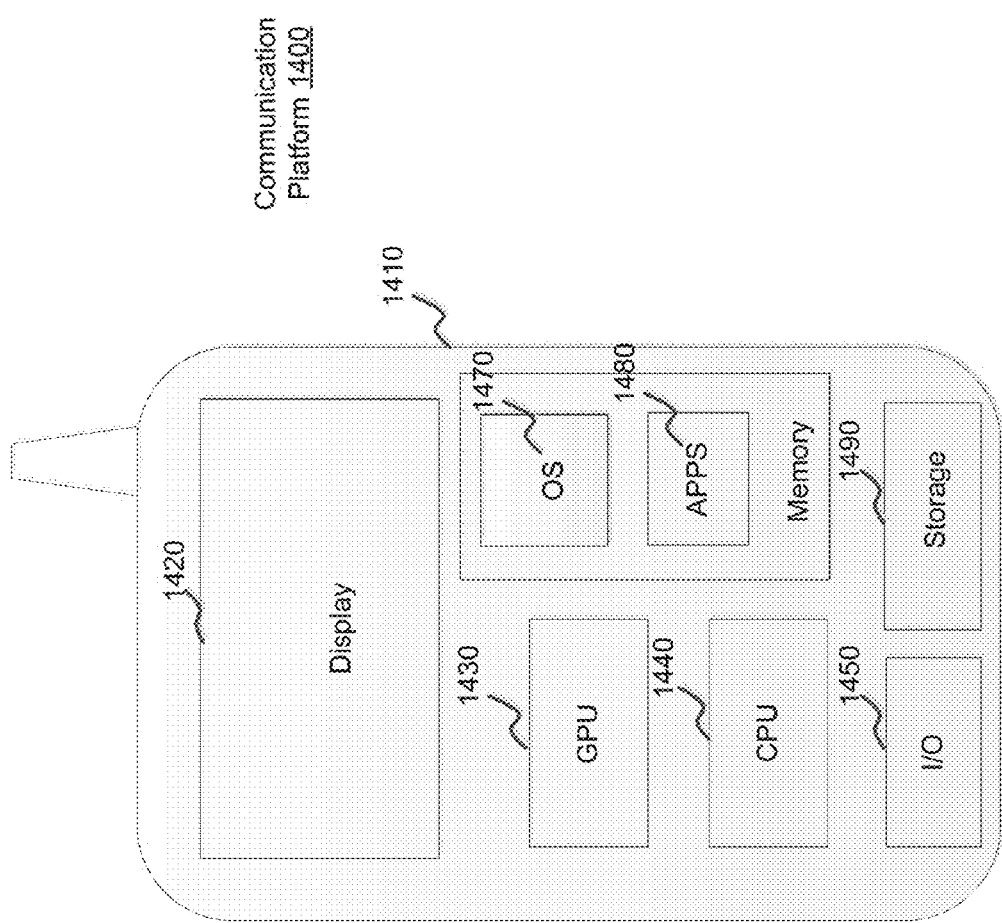
FIG. 14 depicts the architecture of a mobile device which can be used to implement a specialized system incorporating the present teaching.

FIG. 14 depicts the architecture of a mobile device which can be used to realize a specialized system implementing the present teaching. In this example, the user device on which content and advertisement are presented and interacted-with is a mobile device 1400, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1400 in this example includes one or more central processing units (CPUs) 1440, one or more graphic processing units (GPUs) 1430, a display 1420, a memory 1460, a communication platform 1410, such as a wireless communication module, storage 1490, and one or more input/output (I/O) devices 1450. Any other suitable component, including but not limited to a system bus or a controller (not shown), may also be included in the mobile device 1400. As shown in FIG. 14, a mobile operating system 1470, e.g., iOS, Android, Windows Phone, etc., and one or more applications 1480 may be loaded into the memory 1460 from the storage 1490 in order to be executed by the CPU 1440. The applications 1480 may include a browser or any other suitable mobile apps for receiving and rendering content streams and advertisements on the mobile device 1400. User interactions with the content streams may be achieved via the I/O devices 1450 and provided to search engine 130, the query term suggestion engine 140, and/or other components of system 100, e.g., via the network 120.

To implement various modules, units, and their functionalities described in the present disclosure, computer hardware platforms may be used as the hardware platform(s) for one or more of the elements described herein (e.g., search engine 130, the query term suggestion engine 140, and/or other components of system 100 described herein). The hardware elements, operating systems and programming languages of such computers are conventional in nature, and it is presumed that those skilled in the art are adequately familiar therewith to adapt those technologies to enhance query term suggestion described herein. A computer with user interface elements may be used to implement a personal computer (PC) or other input of work station or terminal device, although a computer may also act as a server if appropriately programmed. It is believed that those skilled in the art are familiar with the structure, programming and general operation of such computer equipment and as a result the drawings should be self-explanatory.

Figure 15:
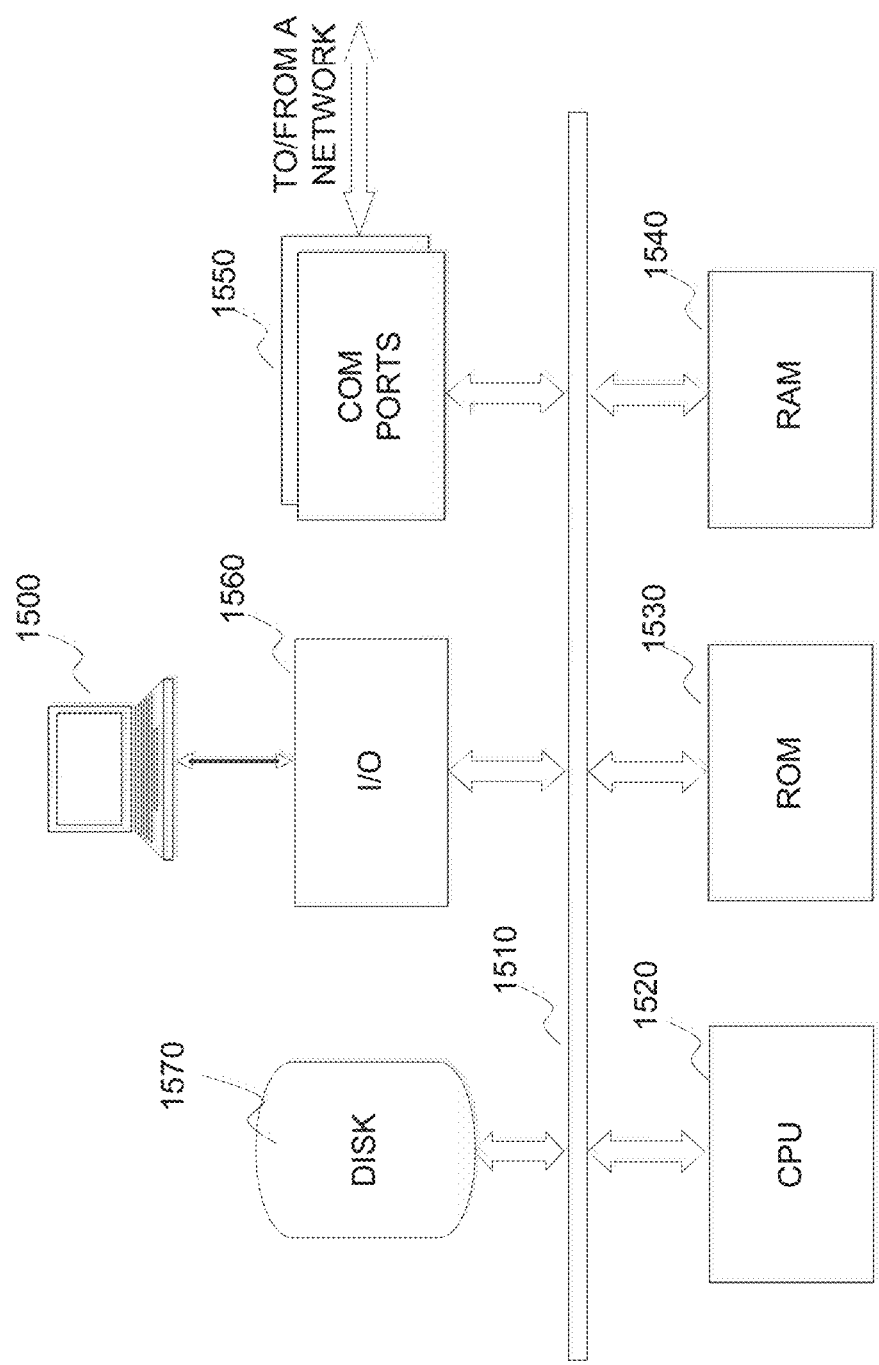
FIG. 15 depicts the architecture of a computer which can be used to implement a specialized system incorporating the present teaching.

FIG. 15 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1500 may be used to implement any component of the enhanced query term suggestion techniques, as described herein. For example, the search engine 130 and/or the query term suggestion engine 140, etc., may be implemented on a computer such as computer 1500, via its hardware, software program, firmware, or a combination thereof. Although only one such computer is shown, for convenience, the computer functions relating to the search engine 130 and/or query term suggestion engine 140 may be implemented in a distributed fashion on a number of similar platforms, to distribute the processing load.

The computer 1500, for example, includes COM ports 1550 connected to and from a network connected thereto to facilitate data communications. The computer 1500 also includes a central processing unit (CPU) 1520, in the form of one or more processors, for executing program instructions. The exemplary computer platform includes an internal communication bus 1510, program storage and data storage of different forms, e.g., disk 1570, read only memory (ROM) 1530, or random access memory (RAM) 1540, for various data files to be processed and/or communicated by the computer, as well as possibly program instructions to be executed by the CPU. The computer 1500 also includes an I/O component 1560, supporting input/output flows between the computer and other components therein such as user interface elements 1580. The computer 1500 may also receive programming and data via network communications.

Hence, aspects of the methods of enhancing query term suggestion and/or other processes, as outlined above, may be embodied in programming. Program aspects of the technology may be thought of as "products" or "articles of manufacture" typically in the form of executable code and/or associated data that is carried on or embodied in a input of machine readable medium. Tangible non-transitory "storage" input media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other search engine 130 and/or query term suggestion engine 140 into the hardware platform(s) of a computing environment or other system implementing a computing environment or similar functionalities in connection with search engine 130 and/or query term suggestion engine 140. Thus, another input of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the enhanced query term suggestion techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network, for providing query term suggestions, the method comprising:

receiving, in a first search session, a prefix of a query term from a user;

obtaining two or more query terms that have been previously entered by the user within the first search session;

obtaining one or more candidate query terms based on the prefix;

determining, for each of the candidate query terms, a similarity between the candidate query term and the two or more query terms by:

obtaining, for the candidate query term, a first feature vector having one or more features associated with the candidate query term;

obtaining, for each of the two or more query terms, a second feature vector having one or more features associated with the query term;

determining a similarity between the first feature vector and each second feature vector; and aggregating the similarities between the candidate query term and the two or more query terms to generate an aggregated similarity indicative of a degree of similarity between the candidate query term and the two or more query terms;

ranking the one or more candidate query terms based, at least partially, on the aggregated similarity associated with each candidate query term; and providing the one or more candidate query terms as query suggestions to the user based on the rankings of the candidate query terms.

2. The method of claim 1, wherein the first search session corresponds to a period of time determined based on a point of time when the prefix of the query term is received from the user and a pre-determined time period.

3. The method of claim 1, wherein the first search session corresponds to a period of time determined based on a predetermined number of query terms entered by the user before the user enters the prefix of the query term.

4. The method of claim 1, wherein:

each of the first feature vectors has the one or more features with respect to a second search session; and each of the second feature vectors has the one or more features with respect to the first search session.

5. The method of claim 4, wherein the similarity between the first feature vector and each second feature vector is determined based on at least one of a cosine distance, a hamming distance, and a Euclidean distance between the first and second feature vectors.

6. The method of claim 4, wherein the aggregated similarity is obtained based on a function, including one of a summation function, a weighted sum function, and an average function.

7. The method of claim 6, wherein a weight in a weighted sum associated with a similarity between a candidate query term and one of the query terms from the first search session is determined based on a distance between the query term in the first search session and the prefix.

8. A system configured for providing query term suggestions, the system comprising:

storage;

a communication platform connected to a network; and one or more processors programmed to execute one or more computer program instructions that, when executed, cause the one or more processors to:

receive, in a first search session, a prefix of a query term from a user;

obtain one or more candidate query terms based on the prefix;

obtain two or more query terms that have been previously entered by the user within the first search session;

determine, for each of the candidate query terms, a similarity between the candidate query term and the two or more query terms by:

obtaining, for the candidate query term, a first feature vector having one or more features associated with the candidate query term;

obtaining, for each of the two or more query terms, a second feature vector having one or more features associated with the query term;

determining a similarity between the first feature vector and each second feature vector; and aggregating the similarities between the candidate query term and the two or more query terms to generate an aggregated similarity indicative of a degree of similarity between the candidate query term and the two or more query terms;

rank the one or more candidate query terms based, at least partially, on the aggregated similarity associated with each candidate query term; and provide the one or more candidate query terms as query suggestions to the user based on the rankings of the candidate query terms.

9. The system of claim 8, wherein the first search session corresponds to a period of time determined based on a point of time when the prefix of the query term is received from the user and a pre-determined time period.

10. The system of claim 8, wherein the first search session corresponds to a period of time determined based on a predetermined number of query terms entered by the user before the user enters the prefix of the query term.

11. The system of claim 8, wherein:

each of the first feature vectors has the one or more features with respect to a second search session; and each of the second feature vectors has the one or more features with respect to the first search session.

12. The system of claim 11, wherein the similarity between the first feature vector and each second feature vector is determined based on at least one of a cosine distance, a hamming distance, and a Euclidean distance between the first and second feature vectors.

13. The system of claim 11, wherein the aggregated similarity is obtained based on a function, including one of a summation function, a weighted sum function, and an average function.

14. The system of claim 13, wherein a weight in a weighted sum associated with a similarity between a candidate query term and one of the query terms from the first search session is determined based on a distance between the query term in the first search session and the prefix.

15. A machine-readable, non-transitory and tangible medium having data recorded thereon for providing search term suggestions, the medium, when read by the machine, causes the machine to perform the following:

receiving, in a first search session, a prefix of a query term from a user;

obtaining two or more query terms that have been previously entered by the user within the first search session;

obtaining one or more candidate query terms based on the prefix;

determining, for each of the candidate query terms, a similarity between the candidate query term and the two or more query terms by:

obtaining, for the candidate query term, a first feature vector having one or more features associated with the candidate query term;

obtaining, for each of the two or more query terms, a second feature vector having one or more features associated with the query term;

determining a similarity between the first feature vector and each second feature vector; and aggregating the similarities between the candidate query term and the two or more query terms to generate an aggregated similarity indicative of a degree of similarity between the candidate query term and the two or more query terms;

ranking the one or more candidate query terms based, at least partially, on the aggregated similarity associated with each candidate query term; and providing the one or more candidate query terms as query suggestions to the user based on the rankings of the candidate query terms.

16. The machine-readable, non-transitory and tangible medium of claim 15, wherein the first search session corresponds to a period of time determined based on a point of time when the prefix of the query term is received from the user and a pre-determined time period.

17. The machine-readable, non-transitory and tangible medium of claim 15, wherein the first search session corresponds to a period of time determined based on a predetermined number of query terms entered by the user before the user enters the prefix of the query term.

18. The machine-readable, non-transitory and tangible medium of claim 15, wherein:

each of the first feature vectors has the one or more features with respect to a second search session;

each of the second feature vectors has the one or more features with respect to the first search.

19. The machine-readable, non-transitory and tangible medium of claim 18, wherein the similarity between the first feature vector and each second feature vector is determined based on at least one of a cosine distance, a hamming distance, and a Euclidean distance between the first and second feature vectors.

20. The machine-readable, non-transitory and tangible medium of claim 18, wherein the aggregated similarity is obtained based on a function, including one of a summation function, a weighted sum function, and an average function.

* * * * *